United States Patent
Ross

(10) Patent No.: US 10,635,399 B2
(45) Date of Patent: Apr. 28, 2020

(54) STOCHASTIC PROCESSING

(71) Applicant: CASSY HOLDINGS LLC, South Jordan, UT (US)

(72) Inventor: Patrick D. Ross, Sunnyvale, CA (US)

(73) Assignee: CASSY HOLDINGS LLC, South Jordan, UT (US)

( * ) Notice: Subject to any disclaimer, the term of this patent is extended or adjusted under 35 U.S.C. 154(b) by 0 days.

(21) Appl. No.: 15/676,324

(22) Filed: Aug. 14, 2017

(65) Prior Publication Data

US 2017/0371623 A1    Dec. 28, 2017

Related U.S. Application Data

(63) Continuation of application No. 13/482,723, filed on May 29, 2012, now Pat. No. 9,778,912.

(60) Provisional application No. 61/519,679, filed on May 27, 2011.

(51) Int. Cl.
| | |
|---|---|
| G06F 7/58 | (2006.01) |
| G06F 21/00 | (2013.01) |
| G06F 21/62 | (2013.01) |
| H04L 9/16 | (2006.01) |
| H04L 9/06 | (2006.01) |
| H04L 9/32 | (2006.01) |

(52) U.S. Cl.
CPC ............... *G06F 7/58* (2013.01); *G06F 7/588* (2013.01); *G06F 21/00* (2013.01); *G06F 21/62* (2013.01); *H04L 9/0662* (2013.01); *H04L 9/16* (2013.01); *H04L 9/3236* (2013.01)

(58) Field of Classification Search
CPC . G06F 7/58; G06F 7/582; G06F 7/584; G06F 7/586; G06F 7/588
See application file for complete search history.

(56) References Cited

U.S. PATENT DOCUMENTS

| | | | | |
|---|---|---|---|---|
| 6,141,668 A | * | 10/2000 | Shimada | G06F 7/582 708/250 |
| 6,678,853 B1 | | 1/2004 | Brummel | |
| 7,191,372 B1 | * | 3/2007 | Jacobson | G01R 31/318519 714/724 |

(Continued)

OTHER PUBLICATIONS

Andrew S. Tanenbaum, Structured Computer Organization, 1984, Prentice-Hall, Second edition, 5 pages (Year: 1984).*

(Continued)

*Primary Examiner* — Jyoti Mehta
(74) *Attorney, Agent, or Firm* — Jason P. Webb; Pearson Butler

(57) ABSTRACT

A system, method, and device for stochastically processing data. There is an architect module operating on a processor configured to manage and control stochastic processing of data, a non-deterministic data pool module configured to provide a stream of non-deterministic values that are not derived from a function, a plurality of functionally equivalent data processing modules each configured to stochastically process data as called upon by the architect module, a data feed configured to feed a data set desired to be stochastically processed, and a structure memory module including a memory storage device and configured to provide sufficient information for the architect module to duplicate a predefined processing architecture and to record a utilized processing architecture.

17 Claims, 7 Drawing Sheets

(56) References Cited

U.S. PATENT DOCUMENTS

| | | |
|---|---|---|
| 2002/0120669 A1 | 8/2002 | Yanovsky |
| 2004/0076293 A1 | 4/2004 | Smeets et al. |
| 2004/0158591 A1 | 8/2004 | Crispin |
| 2004/0162863 A1* | 8/2004 | Barry ............... G06F 7/586 |
| | | 708/254 |
| 2005/0110399 A1 | 5/2005 | Blakley et al. |
| 2006/0047735 A1 | 3/2006 | Nunes |
| 2007/0211890 A1 | 9/2007 | Gebotys |
| 2007/0266067 A1 | 11/2007 | Matsui |
| 2008/0076525 A1 | 3/2008 | Kim |
| 2009/0063601 A1* | 3/2009 | Hunt ............... G06F 7/586 |
| | | 708/250 |
| 2009/0259705 A1 | 10/2009 | Kailas et al. |
| 2010/0070549 A1 | 3/2010 | Nagaraj |

OTHER PUBLICATIONS

Hennessy and Patterson, Computer Architecture A Quantitative Approach, 1996, Morgan Kaufmann, Second edition, 4 pages (Year: 1996).*

* cited by examiner

```
┌─────────────────────────────────────────────────┐
│ RANDOMLY SELECTING A REPLACEMENT DATA            │
│ PROCESSING MODULE    58                          │
└─────────────────────────────────────────────────┘
                         ↓
┌─────────────────────────────────────────────────┐
│ REPLACING THE FIRST DATA PROCESSING MODULE       │
│                      60                          │
└─────────────────────────────────────────────────┘
                         ↓
┌─────────────────────────────────────────────────┐
│ ALTERING THE INFORMATION STREAM    62            │
└─────────────────────────────────────────────────┘
                         ↓
┌─────────────────────────────────────────────────┐
│ RANDOMLY LAYERING    64                          │
└─────────────────────────────────────────────────┘
                         ↓
┌─────────────────────────────────────────────────┐
│ RECORDING STRUCTURE INFORMATION    66            │
└─────────────────────────────────────────────────┘
                         ↓
┌─────────────────────────────────────────────────┐
│ ASSOCIATING WITH A TIME INDEX    68              │
└─────────────────────────────────────────────────┘
                         ↓
┌─────────────────────────────────────────────────┐
│ STOCHASTICALLY PROCESSING    70                  │
└─────────────────────────────────────────────────┘
                         ↓
┌─────────────────────────────────────────────────┐
│ MANAGING RANDOMIZATION    72                     │
└─────────────────────────────────────────────────┘
```

Fig. 5

STOCHASTIC PROCESSING

CROSS-REFERENCE TO RELATED APPLICATIONS

This application is a Continuation Application of, under 35 U.S.C. § 120, and claims priority to, under 35 U.S.C. § 120, U.S. Non-Provisional application Ser. No. 13/482,723, entitled STOCHASTIC PROCESSING OF AN INFORMATION STREAM BY A PROCESSING ARCHITECTURE GENERATED BY OPERATION OF NON-DETERMINISTIC DATA USED TO SELECT DATA PROCESSING MODULES, by Patrick D. Ross, filed on May 29, 2012. This invention claims priority therethrough, under 35 U.S.C. § 120, to the U.S. Provisional Patent Application No. 61/519,679 to Patrick D. Ross filed on May 27, 2011 which is incorporated by reference herein.

BACKGROUND OF THE INVENTION

Field of the Invention

The present invention relates to methods and systems for protecting information, specifically to methods and systems to produce dynamic applications that provide stochastic processing of information.

Description of the Related Art

Many applications require random values as part of their internal processing. Some of these applications have simple requirements like a uniform distribution of values, reproducibility from a given seed value, and very long cycles before they repeat. To that end, many papers and books describe good hardware and software functions that provide these classic random value generators. The attributes of classic random value generators remain both useful and problematic. Before addressing any shortcomings of current random value generators, we generally must first review how these generators work.

There exists a number of properties common to all classic random value generators, whether they be hardware or software based. The cornerstone of classic random value generators is the use of static random functions. Each of these functions processes the current non-zero data value into the next random value in the sequence. The subsequent processing of each new value creates the random sequence. Assuming that a good function is used, the random sequence will pass almost all known statistical tests for randomness.

Numerous random functions have been tested and published. Most of these published functions produce a limited sequence of values before repeating the same sequence of random values. These brief cycle lengths may be too short to be compatible with many applications. In hardware, the random functions are most often described as Linear Feedback Shift Registers (LFSR). Though fewer software functions exist, a number of established functions are available for the designer to use in new applications. Also, most software random functions share the same short cycle attribute.

Whether passing or failing, cycle length proves just as important as statistical testing. Combining multiple published functions in a non-linear manner is the most common way to increase cycle length. The function-based random value generators are correctly called pseudorandom generators and remain easy to "crack" (invert). Cracking a random value generator allows an attacker to anticipate each of the values in the sequence. As a rule of thumb, doubling the classic random function complexity has the effect of squaring the effort required to crack it. As the speed of hardware and therefore computers increases, the battle becomes an arms race between the designer of random value generators and the cracker wishing to break them.

Embracing this rule of thumb, hardware designers adopt evermore complex random value generator functions. The struggle between the designer and cracker persists because the function driven paradigm is inevitably incomplete. The cost to create, test, and deploy new random value generators is thereby open-ended, because each new design is destined to become obsolete. Subsequently, higher recurring chip costs translate directly into product costs. The endpoint along this path is unknown, so a designer cannot anticipate how long their newest function will prove safe from cracking.

The costs of increasing function complexity are manifested in multiple ways. As noted above, the hardware arms race persists as an inevitably incomplete problem. Each new jump in hardware technology generally requires a new corresponding generator design in order to stay ahead of the crackers. This escalating cost forces many application designers to forgo the hardware-based solution. To cut system cost, many application designers resort to software-based random value generators. Often the process of transitioning to a software solution either slows performance unacceptably or increases CPU costs. While the recurring costs are lower without dedicated silicon, the software implementation taxes overall system performance. As the software complexity increases, performance inversely decreases.

In an effort to resist cracking, many designers resort to secret (non-public) designs. Development in secrecy necessitates limited testing, review, or reuse. Unfortunately, secret development guarantees a limited return on investment because low volume of a given design generally always carries higher cost per unit. Furthermore, secrecy only sustains the integrity of these designs until someone obtains a hardware or software example.

The final weakness to these classic functions stems from a simple immutable fact: each random function produces its own random sequence. Stated another way, there is a one-to-one correspondence between the random function and the unique sequence of values it produces. That sequence acts like a "melody" with respect to its generating function. A random "melody" is defined as both the values and the order of those values as they are produced. The seed value only defines where the "melody" starts.

All classic random value generators use a scalar value (starting non-zero seed) to index the point at which their unique "melody" begins. Since classic random value generators are static function-based constructs, the seed value generally must be protected because it acts as the key to define the start of the pseudorandom sequence. In most cases, the size of the seed value is used to indicate the overall cycle length. All hardware and most software based classic random value generators require a non-zero seed value to start generating random values. In almost all cases, a zero value seed will fail to generate any random stream.

In a futile effort to resist cracking, many designers resort to secret (non-public) designs. Development in secrecy necessitates limited testing, review, or reuse. Unfortunately, secret development guarantees a limited return on investment because low volume of a given design generally always carries higher cost per unit. Furthermore, secrecy only sustains the integrity of these designs until someone obtains a hardware or software example. What is needed is a true random value generator, one that implements a true one way function, resulting in a random stream of values that is non-deterministic and/or a method or system that solves one or more of the problems described herein and/or one or more problems that may come to the attention of one skilled in the art upon becoming familiar with this specification. Some improvements have been made in the field. Examples of references related to the present invention are described below in their own words, and the supporting teachings of each reference are incorporated by reference herein:

U.S. Patent Application Publication No. 2011/0029588, by Ross, discloses a system and method of generating a one-way function and thereby producing a random-value stream. Steps include: providing a plurality of memory cells addressed according to a domain value wherein any given domain value maps to all possible range values; generating a random domain value associated with one of the memory cells; reading a data value associated with the generated random domain value; generating dynamically enhanced data by providing an additional quantity of data; removing suspected non-random portions thereby creating source data; validating the source data according to a minimum randomness requirement, thereby creating a validated source data; and integrating the validated source data with the memory cell locations using a random edit process that is a masking, a displacement-in-time, a chaos engine, an XOR, an overwrite, an expand, a remove, a control plane, or an address plane module. The expand module inserts a noise chunk.

U.S. Patent Application Publication No. 2010/0036900, by Ross, discloses a system and method of generating a one-way function and thereby producing a random-value stream. Steps include: providing a plurality of memory cells addressed according to a domain value wherein any given domain value maps to all possible range values; generating a random domain value associated with one of the memory cells; reading a data value associated with the generated random domain value; generating dynamically enhanced data by providing an additional quantity of data; removing suspected non-random portions thereby creating source data; validating the source data according to a minimum randomness requirement, thereby creating a validated source data; and integrating the validated source data with the memory cell locations using a random edit process that is a masking, a displacement-in-time, a chaos engine, an XOR, an overwrite, an expand, a remove, a control plane, or an address plane module. The expand module inserts a noise chunk.

The inventions heretofore known suffer from a number of disadvantages which include being difficult to use, being complex, being expensive, being limited in use, being limited in application, being unreliable, being determinable, being certain, requiring ever larger periods of processing time for subsequent sets of random data, failing to be true "one-way" functions, having vulnerabilities and weaknesses that make it easier for unauthorized users to decrypt information, and the like and combinations thereof.

What is needed is a method, system, apparatus, device, computer program, kit, and/or combination thereof that solves one or more of the problems described herein and/or one or more problems that may come to the attention of one skilled in the art upon becoming familiar with this specification.

The following and/or accompanying disclosure information is provided as non-limiting examples of features, functions, structures, associations, connections, methods, steps, benefits, consequences, and the like that may be included independently, in any open combination, and in any limited combinational form (consisting of) despite any language to the contrary, such as but not limited to "must" "always" "never" "certainly" and the like. Any dimensions provided are exemplary and functionally equivalent ranges that one skilled in the art may recognize after reading this disclosure are implied. Disclosure provided may be prophetic, even if asserted as otherwise.

SUMMARY OF THE INVENTION

The present invention has been developed in response to the present state of the art, and in particular, in response to the problems and needs in the art that have not yet been fully solved by currently available static, (and therefore deterministic) hardware and software solutions. Accordingly, the present invention has been developed to provide a method and/or a system of generating dynamic, nondeterministic solutions in either hardware or software, including but not limited to a system, method and/or device for stochastic processing of information.

According to one embodiment of the invention, there is a system of stochastic processing of information using a computing device. The system may include an architect module that may have a processor. The architect module may be configured to manage and control stochastic processing of data. The architect module may include a run-time modification module that may be configured to randomly alter a stochastic architecture during run-time. The run-time modification module may be seeded from the non-deterministic data pool module. The architect module may be configured to use random values to select between the plurality of functionally equivalent data processing modules during run-time. The architect module may use random values to select run-time durations for use of one of the plurality of functionally equivalent data processing modules during run-time.

The system may include a non-deterministic data pool module that may be functionally coupled to the architect module and may be configured to provide a stream of non-deterministic values that are not derived from a function. The non-deterministic data pool module may include a URNG system. The system may include a plurality of functionally equivalent data processing modules that may be functionally coupled to the architect module, and each may be configured to stochastically process data as called upon by the architect module.

The system may include a data feed module that may be in functional communication with the architect module and may be configured to feed a data set desired to be stochastically processed. The system may include a structure memory module that may have a memory storage device. The structure memory module may be coupled to the architect module and may be configured to provide sufficient information for the architect module to duplicate a pre-defined processing architecture and to record a utilized processing architecture. The structure memory module may include an index module that indexes structure according to a time structure.

The system may include a common data pool processing module that may be functionally coupled to the non-deterministic data pool module and may be configured to stochastically process a common non-deterministic data pool thereby generating an application specific non-deterministic data pool for use by the non-deterministic data pool module.

The system may include a communication protocol interface that may be in communication with the data feed module and may be configured to feed a communication protocol map to the data feed module, receive a stochastically processed communication protocol map from the architect module, and to alter an information stream according to the stochastically processed communication protocol map.

According to one embodiment of the invention, there is a method of stochastically processing information using a computing device. The method may include the step of providing a non-deterministic data pool that is verified to be non-deterministic and is not derived from a function. The method includes verifying that the non-deterministic data pool passes the NIST test with a predominant 10/10 score. The method may include the step of providing an information stream to be processed. The method may include the step of delaying selection of all randomized data processing characteristics until run-time.

The method may include randomly selecting a first data processing module, using a processor, from a set of functionally equivalent data processing modules, each configured to alter data. The method may include the step of determining a random duration of use of the first data processing module during run-time. The set of functionally equivalent data processing modules may be selected from the group of data processing modules including: subtraction, masking, NAND, NOR, OR, XOR, AND, and addition. The method may include seeding a step of randomly selecting a data processing module from the non-deterministic data pool.

The method of stochastically processing information using a computing device may include the step of altering the information stream by use of the first data processing module. The method may include randomly selecting a replacement data processing module, using a processor, from the set of functionally equivalent data processing modules while processing the information stream with the first data processing module. The method may also include replacing the first data processing module with the replacement data processing module.

The method may include the step of altering the information stream by use of the replacement data processing module. The information stream may be configured according to a predefined communication protocol and the first and replacement data processing modules each may sufficiently process the information stream to make the information stream fail to satisfy the requirements of the predefined communication protocol. The method may include randomly layering use of a plurality of data processing modules such that the information stream is processed through multiple randomized layers of data processing modules.

The method may further include the step of recording structure information sufficient to reproduce use of the first and replacement data processing modules. The method may include associating operation of the method with a time index such that operation of the method by counterparts beginning with identical time index positions and an identical non-deterministic data pool may process the information stream identically. The method may include the step of stochastically processing the non-deterministic data pool before utilization of the non-deterministic data pool. The method may also include the step of managing randomization such that each call to a source of random values goes to a different source than each previous call.

According to one embodiment of the invention, there is a stochastic processing device configured to stochastically process information fed therein. The device may include a processor and a non-volatile memory device that may be functionally coupled to the processor. The non-volatile memory device may include a pool of non-deterministic data that may be verified to have passed the NIST test with a predominant 10/10 score. The device may include a data input interface module that may be functionally coupled to the processor and may be configured to receive data. The device may include a data output interface module that may be functionally coupled to the processor and may be configured to send data.

The device may also include a data processing module that may be functionally coupled to the processor and may include a plurality of functionally equivalent data processing instruction sets. The device may include an architect module that may be functionally coupled to the processor, the data processing module and to the non-volatile memory device. The architect module may be configured to manage and control stochastic processing of data according to seed values from the pool of non-deterministic data by randomly selecting data processing modules during run-time, thereby processing data received through the data input interface module and providing stochastically processed data to the data output interface module.

In one embodiment, a single, formerly static solution is transformed into many dynamic custom solutions within the same implementation. This new genome of solutions is based on a number of new technologies, including but not limited to one or more of the following modules:

Uncertainty Function—One Way Function
Uncertainty Random Number Generators
Dynamic Selection of Processing Components
Delayed Binding of Components Until Needed
On Demand Remixing of Components
Data Driven Implementations Embodiments of this new genome of dynamic solutions simplify many preferred solutions. The replacement of static, "one size fits all" applications with custom solutions resolve many currently unsolved problems.

In another embodiment, all of these new techniques come together as an open-ended architectural solution for generating random values. This kind of architectural model scales from very low cost products to extremely demanding applications, based on their random data requirements. Thus, we arrive at data morphing data instead of functions processing data.

In still another embodiment, there is a method of morphing static protocols into evolving protocols. Custom, dynamically evolving protocols become impossible to hack.

In still another embodiment, a simple hash value can be upgraded to become secure digital signatures. Assuming "service providers" only support these secure digital signatures, then any unauthorized hash values are ignored. Thus, these digital signatures become a form of revocable access control. This approach to access control can extend to any item, phone number, email address, IP address, control system, financial transaction, etc.

In still another embodiment, a correctly implemented example of the custom solutions will be harder to invert than the same cost static solutions, assuming the session data (to be defined later) has not been compromised. This means that everyone can use the same public hardware/software implementation yet still have the same resistance to cracking.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIGS. 4-5 illustrate a method of stochastically processing information using a computing device.

DETAILED DESCRIPTION OF THE INVENTION

Figure 1:
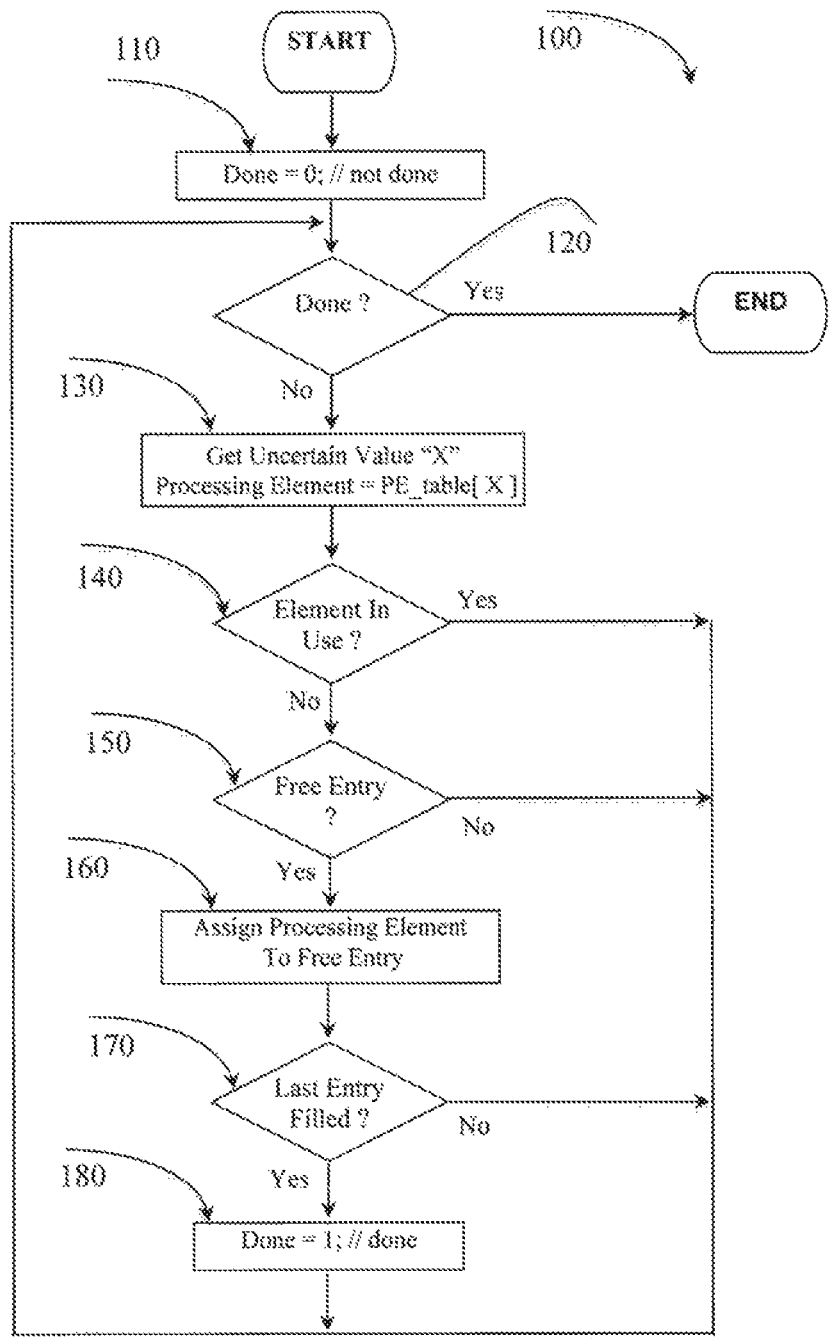
FIG. 1 is a flowchart depicting a selecting process of elements for an instance of stochastic module/process, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Any of the functions, features, benefits, structures, and etc. described herein may be embodied in one or more modules. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor, and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

It remains difficult to solve a Calculus problem by employing Algebra. These math tools are designed to deal with different types of problems: dynamic vs. static. Note, whenever we apply the incorrect tool to solve a problem, we inevitably settle for suboptimal solutions. Currently, hardware and software development confines solutions within a narrow range of functionality, usually within a static, and therefore deterministic range. Like Algebra, these implementations are very good for solving some problems. However, they remain inadequate when asked to address problems that are better answered by dynamic solutions. Before we can focus on dynamic solutions, we generally must first review the current mathematics confining us to static solutions.

Uncertainty Function

The principle of "certainty" dominates the field of Mathematics; by certainty, We mean that traditional mathematics provides functions where input values (domain values) are used to mechanically compute a certain output (range value). Thus far, due to the mechanical nature of computation, this process has generally always resulted in a deterministic (range) value given any domain value. This truth of deterministic functions has held for hundreds of years.

The effects of certainty can be recognized as a major cryptographical flaw, especially when it comes to random number generation. Many people have proposed solutions where this certainty is reduced by infusing some amount of "entropy" (noise) to break up the normal certainty of function computation. These solutions are major improvements, but they still fall short in escaping the trap of mathematical certainty.

As students of Algebra, we are all taught, tested, graded and promoted by the sacred preservation of the equal sign. Each subsequent math class continues to reiterate this point. In order to keep both sides equal, we generally must manipulate the left side of the equation in the same manner that we manipulate the right side of the equation.

After centuries of using functions, we only found deterministic functions. Thus we assume that only deterministic functions exist. This long history and our common math training prevent us from recognizing the possibility of nondeterministic functions. There are three possible relationship mappings between domain and range: one-to-one (domain-to-range mapping for traditional functions), many-to-one (many different domains mapping to the same range as found in Hash Functions), and the missing relationship for domain-to-range mapping—one-to-many.

So, why would the missing one-to-many domain-to-range mapping be important? While a traditional function is deterministic and therefore invertible, this new function class is nondeterministic and noninvertible. Unlike traditional functions that can only produce certainty from a domain value, this new function class provides us with "uncertain" range values. Hence, we name each member of this new function family as an Uncertainty Function.

Let us demonstrate why no one can invert an uncertainty function. We have seen the graphical plot of many traditional functions. These traditional plots prove that any range value can be mapped back to its domain value. In contrast, each uncertainty function domain value maps to all uncertainty function range values. The graphical plot of one domain value is a vertical line. Therefore, the graphical plot of all valid domain values shows that the plot of the uncertainty function is completely "black". This black graphical plot means that range values are independent of domain values. Thus, no one can find the unique domain value that produced any given range value. The Uncertainty Function is the basis of the mathematics of uncertainty. This function class spawns an idea that "uncertainty" can be expanded from data into nondeterministic chaotic actions. These chaotic actions define the means to create dynamic custom solutions that may be unique.

So, why talk about Algebra, domain vs. range relationships, and graphical plots? Surprisingly, all current digital products already use the Uncertainty Function. Yet none of these product designers have seen the mathematical implications. We know this function by its more common use as simple RAM (Random Access Memory). The read of a memory cell within a buffer filled with random data produces a nondeterministic value. Each valid memory address maps to a memory cell that can contain any possible range value. The graphical plot of RAM (the uncertainty function) is black. One cannot predict the memory address (domain value) given a memory (range) value. These are profound enhancements over the mathematics of certainty.

The memory buffer used within the Uncertainty Function is called the "pool of uncertainty." Each read from this pool produces a nondeterministic value called Uncertain Data. Uncertain Data remains "uncertain" if and only if no one ever sees its true value. Therefore, releasing values from the pool of uncertainty presents us with a paradox—how do we read from the data pool without exposing the contents of the pool? This issue defines the Data Paradox.

While the Uncertainty Function is necessary, by itself, it is not sufficient to deal with the data paradox. The first functionally complete technology after the Uncertainty Function is the creation of a nondeterministic Uncertainty Random Number Generator (URNG). Two additional data paradox technologies are required to protect the integrity of the pool of uncertainty.

The Ironic Solution to the Data Paradox

The attributes of uncertain data create the data paradox, but these same attributes facilitate an ironic solution: Randomly selecting two uncertain data values from the pool and adding them together results in a new uncertain value. This new value is "decoupled" from the values of its parents, as a plurality of different sets of parents can result in that same value. Therefore, the attribute of "uncertainty" has carried forward to the next generation of values. So, while one generally must generally never reveal first generation uncertain data, one can release subsequent generations that have been processed from it, and thus, the data paradox has been resolved. So long as randomly selected uncertain values are processed with most binary or higher operators, the results are nondeterministic. In this way, we arrive at data morphing data instead of functions processing data. We have, in effect . . . escaped from mathematical certainty.

The process where we hide or decouple the first generation of uncertain data from subsequent generations is called the Decoupling Process. Earlier in this document, the first instance of the decoupling process has been applied to Uncertainty Function range values. To complete the task of protecting the integrity of the pool of uncertainty, we generally must also decouple domain (memory address values) as well as range values.

While the first generation of uncertain data has a fixed size, subsequent generations can be of arbitrary size. Metaphorically speaking, this "pool" can be amplified into a lake, a bay, or even an ocean of uncertainty depending on how much processing one chooses to invest.

Static functions or processes generally always lead to deterministic (predictable) behavior. To overcome this behavior, we reach for the only pure nondeterministic means we have—uncertain data. We generally must leverage this means in order to cleanse deterministic behavior from internal (URNG) functions, processes, and data. This multi-leveled cleansing effort results in a nondeterministic random number generator that is no longer limited to the size of the pool of uncertainty. Specifically, we decouple both addresses and data through the use of uncertain data within the context of a random edit process.

Outline of URNG

The outline of each URNG has three steps. When the URNG starts, we have only two initial ingredients: a pristine, nondeterministic pool of uncertainty and a collection of obscenely deterministic Pseudo-Random Number Generators (PRNGs). From these ingredients, we generally must construct intermediate tools for internal use. The first tool is the uncertain stream. This stream is created when any good PRNG is applied as an address generator to read from the pool of uncertainty, thereby giving us a raw, paradox unsafe, random stream of uncertain values.

The next intermediate tools utilize the uncertain stream. Using other independent PRNGs and the uncertain stream as inputs to a random edit process, we obtain nondeterministic data pool addresses, which become the domain values to the uncertainty function. The act of using these relatively "cleansed" domain values produces uncertainty function range values that no longer echo evidence of a creation history.

The last step resolves the data paradox of the range values. Given two range values via "cleansed" domain values, and one raw uncertain value, we can now complete the decoupling of the range values. In summary, the repetitious use of uncertain data has washed away some/most/all of the deterministic behavior found within the intermediate tools. The nondeterministic addresses have become the paradox safe domain values to the uncertainty function. By decoupling both addresses (domain values) and data (range values) from the uncertainty function, we achieve our essential goal of a nondeterministic random number generator.

A correctly implemented URNG has major advantages over a classic PRNG. In particular, the overall resistance to cracking is not derived from the complexity of functions; instead, it comes from the simplicity of uncertain data. This naturally "private" random number generator encourages a whole range of new technologies that enables many applications.

A "hardware selector" or "Mask Generator" takes bits from two input values (data0, data1) to create a new value. Each "0" bit in the "mask" takes the corresponding bit from data0, while each "1" bit in the "mask" takes the corresponding bit from data1. The destructive edit value specified by the "mask" value produces the following result:

result=(mask & data0)|(mask & data1); While data0 and data1 can be deterministic, if the mask is nondeterministic (raw uncertain data), then the result is also nondeterministic (a paradox safe value) so long as the mask is generally never visible in the output.

Mask URNG

Examine the 10 line C procedure below to see a Mask URNG. This code example (urng_value) is the equivalent of the three-step process described above. The section "C header" completes any missing details.

selector); the result is dynamic switching between different functions. Thus, the dynamic creation of possible functions to be executed becomes the Chaos Engine. Notice that, at any time, functions within the list can be replaced or the entire list is dynamically recreated at runtime via random data. This reconstruction of the list should routinely occur at random intervals.

Like all random edit processes, neither the instruction nor the edit streams are visible in the output stream while both values come from the pool of uncertainty, (i.e. independent uncertain streams). Here is an example of a simple 16 instruction Chaos Engine (see below): In this instance of a Chaos Engine, each "instruction" has three operands—data0, data1, and mask values. These values are processed into "Result". As you can see, not all instructions use the mask value.

```
Result = Data0 - Data1;   // standard math subtract operation
Result = Data1 - Data0;   // standard math subtract operation
Result = (~Mask & Data0) | (Mask & Data1); // normal mask Generator
Result = (Mask & Data0) | (~Mask & Data1); // the other mask Generator
Result = (~Mask & ~Data0) | (Mask & Data1);
Result = (~Mask & Data0) | (Mask & ~Data1);
Result = ~(Data0 & Data1); // bitwise NAND between two data elements
Result = ~(Data0 | Data1); // bitwise NOR between two data
Result = Data0 | Data1;    // bitwise OR between two data elements
```

```
typedef struct
{
uint32_t        poolsize;  // allocation size in r_values
uint32_t        modulo;    // prime number addressing modulo
t_prng          prng[ NUM_STOCHASTIC_POINTS ]; // PRNG addressing functions
r_value         *pool;     // data pool pointer
} t_urng;
r_value urng_value (t_urng *urng)
{
r_value unsafe_1, unsafe_2;     // paradox unsafe PRNG deterministic values
r_value domain_1, domain_2;     // paradox safe domain values
r_value mask1, mask2, mask3;    // Raw nondeterministic values from the pool
// Use 3 independent PRNGs to read uncertain mask values from the pool
mask1 = urng->pool[ prng (1) % urng->modulo ];
mask2 = urng->pool[ prng (2) % urng->modulo ];
mask3 = urng->pool[ prng (3) % urng->modulo ];
// Convert deterministic PRNG values into a paradox safe domain values
unsafe_1 = prng (4);
unsafe_2 = prng (5);
domain_1 = (~mask1 & unsafe_1) | (mask1 & unsafe_2 ) % urng->modulo;
unsafe_1 = prng (6);
unsafe_2 = prng (7);
domain_2 = (~mask2 & unsafe_1) | (mask2 & unsafe_2 ) % urng->modulo;
// Manufacture a nondeterministic value from the pool while hiding domain and range
return (~mask3 & urng-->pool[ domain_1 ]) | (mask3 & urng->pool[ domain_2 ]);
};
```

An Introduction to Chaotic Actions

Uncertain data plays multiple roles within the URNG: random data, seed values, mask values, function selectors, and even instructions. Once again, a seemingly trivial idea has a profound effect. The philosophy of uncertainty dictates that many programming decisions are deferred until execution, at which point they are driven by random data. As randomness plays an increasing role in program execution, the overall effect upon the application is that it becomes less deterministic.

Given a collection of functions that resolve the data paradox, random data is used to select which functions will be executed. Groups of functions can be selected to fill a list, when random data is used as instructions (i.e. a function -continued

```
Result = Data0 ^ Data1;   // bitwise XOR between two data elements
Result = Data0 & Data1;   // bitwise AND between two data elements
Result = Data0 + Data1;   // standard math add operation
Result = ~Data0 | Data1;  // Comp Data0, bitwise OR two data elements
Result = Data0 | ~Data1;  // Comp Data1, bitwise OR two data elements
Result = ~Data0 ^ Data1;  // Comp Data0, bitwise XOR two data
                          //   elements
Result = Data0 ^ ~Data1;  // Comp Data1, bitwise XOR two data
                          //   elements
```

It is understood that the possible set of instructions is much greater than 16, and uncertain data was used to create this list (both the order in the list and which instruction to use). Full-scale implementations of these nondeterministic chaotic actions have produced millions of unique data driven instructions for the URNG. Thus, the nondeterministic nature of uncertain data is translated into nondeterministic chaotic actions. This Chaos Software within the URNG becomes another example of data morphing data.

As a general philosophy of chaos engines, any function can be invoked under any number of common parameters. This data driven Chaos Software may be used to create any number of reproducible stochastic systems. It is possible to customize chaos engines with unique random data from the pool of uncertainty, or in other examples, a URNG. The general application of Chaos Software is covered in the section on Stochastic Processing.

Simple simulations should guide the correct selection of implementation parameters. In this mask URNG, only destructive edit via uncertain mask values are used in the decoupling process. While functional, this low-cost URNG may fail to be useful with small pools of uncertainty. A much better solution can be found with a Chaos Engine. The chaos URNG gives us massive amounts of random data from a reasonably sized pool of uncertainty.

Chaos URNG

Check out the short C procedures below to see a Chaos URNG. The section "C header" completes any missing details.

```
typedef struct
{
r_value        instruction;   // random value holding instructions
r_value        PC;            // current instruction counter within above instruction
edit_process   operation[ MAX_REPS ]; // table of chaos operations (Random Edit Processes)
} t_chaos;
typedef struct
{
uint32_t       poolsize;      // allocation size in r_values
uint32_t       modulo;        // prime number addressing modulo
t_prng         prng[ NUM_STOCHASTIC_POINTS ]; // PRNG addressing functions
t_chaos        cpuAdr0;       // address chaos engine
t_chaos        cpuAdr1;       // address chaos engine
t_chaos        cpudata;       // data chaos engine
r_value        *pool;         // data pool pointer
} t_curng;
r_value get_instruction (t_curng *urng, t_chaos *cpu)
{
r_value        instruction, instr;
instruction = cpu->instruction; // local copy of instruction block
if (cpu->PC >= INSTRUCTIONS_PER_WORD) { // need new block?
instruction = urng->pool[ prng(0) % urng->modulo ]; // get next instruction block
cpu->PC    = 0;     // reset to start of block
}
instr   = instruction & INSTRUCTION_MASK; // slice off instruction from word
cpu->instruction = instruction >> INSTRUCTION_SHIFT; // move to next instruction
cpu->PC++;
return instr;
};
r_value urng_value (t_curng *urng)
{
r_value unsafe_1, unsafe_2;      // paradox unsafe PRNG deterministic values
r_value domain_1, domain_2;      // paradox safe domain values
r_value mask1, mask2, mask3;     // Raw nondeterministic values from the pool
r_value instr;                   // chaos instruction
// Use 3 independent PRNGs to read uncertain mask values from the pool
mask1 = urng->pool[ prng (1) % urng->modulo ];
mask2 = urng->pool[ prng (2) % urng->modulo ];
mask3 = urng->pool[ prng (3) % urng->modulo ];
//
// Decouple paradox unsafe (deterministic) values with address chaos engines
// to create two paradox safe (nondeterministic) domain values.
//
unsafe_1 = prng (4);
unsafe_2 = prng (5);
instr    = get_instruction( urng, &urng->cpuAdr0 );
domain_1 = (*urng->cpuAdr0.operation[instr]) (unsafe_1,unsafe_2,mask1) % urng->modulo;
unsafe_1 = prng (6);
unsafe_2 = prng (7);
instr    = get_instruction( urng, &urng->cpuAdr1 );
domain_2 = (*urng->cpuAdr1.operation[instr]) (unsafe_1,unsafe_2,mask2) % urng->modulo;
//
// Using data chaos engines to decouple range values from uncertainty function
//
instr    = get_instruction( urng, &urng->cpudata );
return (*urng->cpudata.operation[instr])(urng->pool[domain_1]. urng->pool[domain_2], mask3);
};
```

Today, there are only a few thousand known function-driven RNGs. Switching from function-driven to data-driven RNGs means trillions of unique RNGs that can pass the National Institute of Standards and Technology NIST (800-22), test suite for randomness. While one can pass the NIST tests with scores of 8/10, thus far, each URNG with 10/10 data pools receives almost all 10/10 scores.

Comparison of Random Number Generators

TABLE 1

| Classic PRNG | Entropy PRNG | URNG |
|---|---|---|
| Pseudo Random | Pseudo Random + Entropy | Full Entropy |
| Function Driven | Function Driven with data updates | Data Driven |
| No Cracking Resistance | Better Cracking Resistance | Best Cracking Resistance |
| Not valid for Crypto | Currently used for Crypto | Best for Crypto |
| Single Static Random Stream | Multiple random streams/based on Entropy | Unlimited random streams (same pool)* |
| No Sub-streams | No Sub-streams | Randomly Addressable Sub-streams* |
| Static Implementations | Generator not normally shared | Pool shared between users* |
| Not used for Crypto | Used to create Crypto Keys | Public seed (timestamp or pool address) |
| NA | Requires Key Exchange | Supports Private Keyless Encryption |
| NA | Unknown Crypto life span | Unique Data remains ageless |
| Fixed Implementation | Fixed Implementation | Unique Date gives Unique Implementation |
| Seed -> start of single stream | Seed + entropy starts stream | Dynamic seed from timestamp |

*The addressability of the Uncertainty Function means that pool addresses can be manipulated without affecting the pool of uncertainty. Therefore, many different addressing models may be applied to the same pool.

A one-time data exchange may now possibly replace any or all cryptographic key exchanges with a common URNG implementation. The data exchange can effectively exchange random number generators. Thus, unique on-demand key generation replaces any process that formerly required key exchanges. There are an unbounded number of ways to exchange data, from physical exchange of media to any form of wireless transfers. Whatever the means, each party that holds the same data also holds the means to create the same random streams.

The use of dispersed, identical random number generators, which do not require any active connection, infrastructure, or additional authentication, represents a major simplification of many protocols. Furthermore, when applied to stochastic processing, the effect represents an exchange of custom applications/solutions.

Given an URNG implementation with isolated nonvolatile storage, a one-time load of random data provides an effective hardware encapsulation. This permanently protected implementation can provide random streams for use in any number of applications.

A 128 Kbyte memory buffer holds $2^{1048576}$ unique values, which represents much more than $10^{300,000}$ values. While not all of these values become random enough to pass the statistical validation process, a large number of them qualify. While technology implementations come and go, good random data remains "ageless". So long as the pool data remains unknown, it is unlikely that any properly implemented URNG will be cracked by analyses of the random output stream. The random number generator resists cracking solely based on data, rather than complex implementation.

It's about Time

Domain values applied to the uncertainty function represent fine grain addressing into the pool of uncertainty, while timestamps represent larger discontinuous jumps between different streams of uncertain values. We tend to think about time relative to a human scale of events. Time intervals much smaller or larger than we normally deal with remain less meaningful to us, such as microseconds or millennia. In spite of our limitations of perception, time becomes vital throughout uncertainty technologies. The properties of time are tapped in many applications. It is helpful to review these time properties so that we can understand their role in terms of the principles of uncertainty. A timestamp generally always signifies a scalar value relative to some zero point. Analog/hardware clocks present a "beat count" of some kind. In software, the timestamp increment may not generally always map into a real world "beat count", such as in the case of U.S. Pat. No. 5,526,515, which is incorporated by reference herein for its supporting teachings. While the difference between timestamps can be computed to any value, the basic model of time generally always moves in a "monotonically" increasing manner.

An increasing sequence number (as found in many digital protocols) exhibits a common, but normally unrecognized form of a timestamp. Although these sequential values do not map into a real-world view of time, they can legitimately measure time moving forward. This represents one of the forms of time utilized throughout uncertainty technologies.

Memory addressing can be upgraded by blending timestamps into addressing computations, thereby recasting the base uncertainty function into one driven as a function of time. As time continues to be monotonically increasing with discontinuous jumps, the same time-based random stream should not appear for any other value of time.

If one combines evolving time and a source file, then one obtains a unique random sequence for each instance of the URNG. This means that random sequences remain completely "chaotic" with respect to its continuous tapping of the same source file. The continuous creation of unique pools of uncertainty blocks/thwarts any formal analyses of random sequences.

An uncertain time model is used to reproducibly transform any timestamp into a URNG seed value(s). As an open-ended architectural concept, there are an unlimited number of possible time models. The timestamp may or may not be mapped into a more familiar measure of time. These time models become part of a source file. Each time a source file is created, an uncertain time model is also created via uncertain random values. An uncertain zero point in time is selected. Any input timestamp generally represents an "unknowable" offset (delta) from the uncertain zero point in time. The difference between the zero point in time and the timestamp can be expressed through (any arbitrary) units like days, hours, minutes, seconds, milliseconds, etc. Within the time model, we select uncertain scaling factors for each supported unit of time. We then compute required URNG seed values by scaling each supported time unit, and subsequently summing them into values that become the seed(s). In this way, via an uncertain time model, a public timestamp can be used to define private seed values. Thus, anyone sharing the same time model (within a source file) can also create the same random stream. These seed values represent two starting indexes into the pool of uncertainty, which become the values found in the Data Congruential Generator (described below). From this first addressing function, all other initializations' values are read from the pool of uncertainty.

For example:

Seed0=(delta_days*dayscale)+
(delta_milliseconds*millisecondscale);

Seed1=(delta_hours*hourscale)+
(delta_minutes*minutescale)+
(delta_sec*secondscale);

Stochastic Processing

Dynamic applications simplify many solutions. The methodologies of Stochastic Processing give us an open-ended architectural means to create dynamic hardware or software applications. In many cases, the deployments of these dynamic implementations redefine many current (preferred) solutions. There are additional classes of problems that can only be effectively solved by dynamic applications. The example embodiment for Dynamic Digital Protocols is a class of problem requiring a dynamic application.

The current software development process has stabilized into a well-understood model of handcrafted code units, somehow joined to create applications. The effective use of randomness has not progressed with the rest of software development. The current deployment of flawed randomness technology fails to exploit its true potential. Current applications of randomness remain primarily limited to reducing repetitious behaviors in gaming (gambling), video/computer games, and simulations.

A more robust application of randomness can support the runtime augmentation of applications by dynamically creating updates. The dynamic execution of updates morphs a base application into a custom application, which may be unique. This more expansive deployment of randomness is called Stochastic Processing.

Design Time Vs. Runtime Binding

In the software object paradigm, the binding (making connections) between classes is completed before runtime execution. The tool set completes this static binding task to improve programmer productivity. However, the downside of static binding is clear, as only a limited number of connections are ever made. Stochastic processing makes many more connections available at runtime instead of design time.

As the name implies, stochastic processing relates to random processing. The use of random technology in most current applications is limited to a few common tasks, such as dice (a probability function), or as a "wild card" value (any value within a supported range). The principles of stochastic processing make a wider range of new processing options possible. When used properly, these principles will solve many previously unresolved technology problems. The examples given here are for teaching the concepts, and only present a sample of the value of stochastic processing. While these ideas are simple to understand, the reader will have to think (or rethink) about how best to use them in their applications. As hardware designers and software developers come to understand these elements, they will be surprised by the transformative nature of this new technology.

For effective stochastic processing, each decision that can migrate from the design phase to the execution phase increases the uncertainty. For barely any cost, some functional parameters can become data driven, thus increasing the algorithmic complexity of the implementation. Within the same data driven cost structure, the selection and configuration of processing elements can "explode" the overall algorithmic complexity. The on-demand remixing of processing elements and/or redefining functional parameters further increases the uncertainty. The net result of a design that was limited to a single solution, now creates dynamic custom solutions that are much more likely to be nondeterministic.

The Principles of Uncertainty

The principles of uncertainty represent an unusual convergence of ideas across mathematics, computer science, and electrical engineering . . . producing dynamic, custom hardware/software implementations. Outside of sampling natural "noise", the process of random number generation has not had a robust functionally complete solution. Given the mechanical nature of computation, traditional "function-driven" solutions cannot create a valid representation of randomness. While function-driven solutions remain fatally flawed, data-driven solutions can give practical representations of randomness. The "unknowable" data transforms a common implementation into unique random streams.

Conventional wisdom holds that hardware/software solutions are statically defined during development, so these traditional solutions inevitably lead to a "one size fits all" mentality. Worse yet, these implementations are limited to a single solution for any given problem. The effect of an isolated solution means that they often become deterministic. Deterministic behavior is the antithesis of randomness. This flawed (deterministic) behavior extends across many applications that are better solved with dynamic, rather than static, solutions.

Currently, software (and hardware) applications can be defined as a "joined" collection of components. Instead of limiting the set of components to be "just enough" to create a single solution, we increase the pool of "functionally equivalent" components so that one could create many solutions. Next, we use random data to select, during execution, which set of components will be used to create this instance of the application. Thus, from a common implementation, driven by random data, we have created an uncertain custom solution that may be nondeterministic.

The Uncertainty Random Number Generator (URNG) is a dynamic solution in either hardware or software. Within the current URNG implementation, there are over one hundred components that become joined (and remixed) as needed during execution to create a nondeterministic random number generator. Even better, since this is a data driven solution, each use of the URNG can be driven by a dynamically created pool of uncertainty that may be used once and then discarded. With this degree of randomness, these URNGs can be the means to drive future dynamic applications.

"Functional Equivalency" is Solely Based on Application Requirements

Within the methodologies of Stochastic Processing, the meaning of "functionally equivalent" is much more sensitive than the typical case found in the object paradigm. Typically, the software paradigm leads developers to ignore most implementation side effects in order to raise productivity. Sometimes, these side effects matter and ignoring them undermines the developer's goals.

For example, let us note the case of random number generators. There are thousands of them and most have the same properties. Most of these generators remain relatively fast but not cryptographically secure, while a few are secure but slow. So, if one sorts between secure and unsecure generators, are they roughly equivalent within each category? No. When we acquire multiple random numbers from the same unsecure generator, we find that the values are highly correlated to the extent that one can predict the next value. Hence, it is not "random". Though secure generators appear less correlated, they remain slower and rarely sharable.

Current unsecure random number generators are assumed to be functionally equivalent, but each of them are ineffective at producing random values because there is a single random stream for each generator. The only functional equivalence of these unsecure random number generators rests with their flaws, yet application requirements for randomness still remain. Therefore, we generally must be careful when defining functional equivalence. Failure to define functional equivalence correctly may result in an application design as flawed as existing unsecure random number generators.

Some background information on current random number generators is required to explain these new methodologies of Stochastic Processing. Any given "functionally equivalent" processing element may have unusual side effects that are useful. Within the first teaching example, multiple common (but flawed) random number generators are used to replace the sole default generator found in software libraries. Additional teaching examples show a richer illustration of functionally equivalent processing elements.

Stochastic "Scaffolding Points"

The first teaching example has seven calls to different "random number generators" to create memory addresses. Any method that provides good random memory addresses could therefore replace these classic PRNGs, as they would be functionally equivalent. To overcome the basic flaws of "single stream" PRNGs, each current call is routed to a different PRNG. So, each one of them returns values from a different random sequence, which is much better than seven sequential values from the same sequence. While multi-PRNGs solution is a major improvement, the best solution for all other dynamic applications is to use an URNG to provide non-correlated, nondeterministic values.

Failure to deploy either of the above solutions produces poor results. Applying classic PRNGs to select processing elements remains as flawed as the generators, only producing deterministic selections. Instead, using the Uncertainty Function or the URNG to select processing elements produces nondeterministic selections. Any point in a hardware or software application that can accept a functionally equivalent processing element is called a stochastic "scaffolding point".

Collections of Processing Elements Abstraction

Application-specific collections of processing elements are created to provide many options. Each time we define such a collection of processing elements, we generally must size the collection and define the required "quality" of each element. Often, though an unbounded number of processing elements may exist from which we can select, most applications only require the collections to have many times what they normally deploy. Clearly, some applications will replace common choices with their own custom collection.

The term "collection of processing elements" is an abstraction that can be implemented in different ways. For example, in hardware, an LFSR (Linear Feedback Shift Register—classic hardware random bit-value generator) is seeded with a value to create a random bit stream. However, if a programmable LFSR is used, it can be reconfigured to generate many different random bit streams. In this way, the configuration options within the programmable LFSR define the possible collection, thereby providing choice. These configuration options create a virtual collection.

The same virtual collection idea can be applied through options in software. For example, a set of optional uncertain parameters can be defined to further process operands of the URNG's Random Edit Process. In this case, the pre-processing of operands can include bitwise rotate left/right (with bit count), bitwise NOT, reverse bit order, etc. The same sequence of options can be applied to the result. The deployment of these uncertain parameters (options) "explodes" the size of the normal collection to create a massive virtual collection.

As for the quality of each processing element, this also becomes an application-specific design choice. In the case of the URNG itself, the first patent dealt with the use of inexpensive, yet deterministic PRNGs. A better quality replacement for creating uncertainty function domain values can be found in the Data Congruential Generator (defined later). However, we can continue with the valid teaching examples assuming common PRNGs.

The creation of the collection of processing elements was to facilitate runtime selection. We use random data to select which element(s) to use. FIG. 1 is a flowchart depicting the selection process. Note the case where selection is required.

FIG. 1 is a flowchart depicting an embodiment of selecting processing elements for this instance of stochastic module/process 100 in which the initial condition is set to not "Done=0" 110. The loop until "Done" 120 continues with obtaining an Uncertain Value "X" that is used to select a possible Processing Element from the PE_table 130. This possible processing element is tested (see FIG. 2) to see if it is already in use 140. If the Processing Element is already "in use", then the loop starts over with the next Uncertain Value 120. However, if the Processing Element is "not in use", then a test is made looking for the next "free" (available) entry 150, where the Processing Element is assigned to the free entry 160, and the loop starts over. If the last entry has been filled 170, then the terminating condition "Done=1" is set 180 and the loop starts over. The embodiment of selecting processing elements terminates when "Done" is true.

Figure 2:
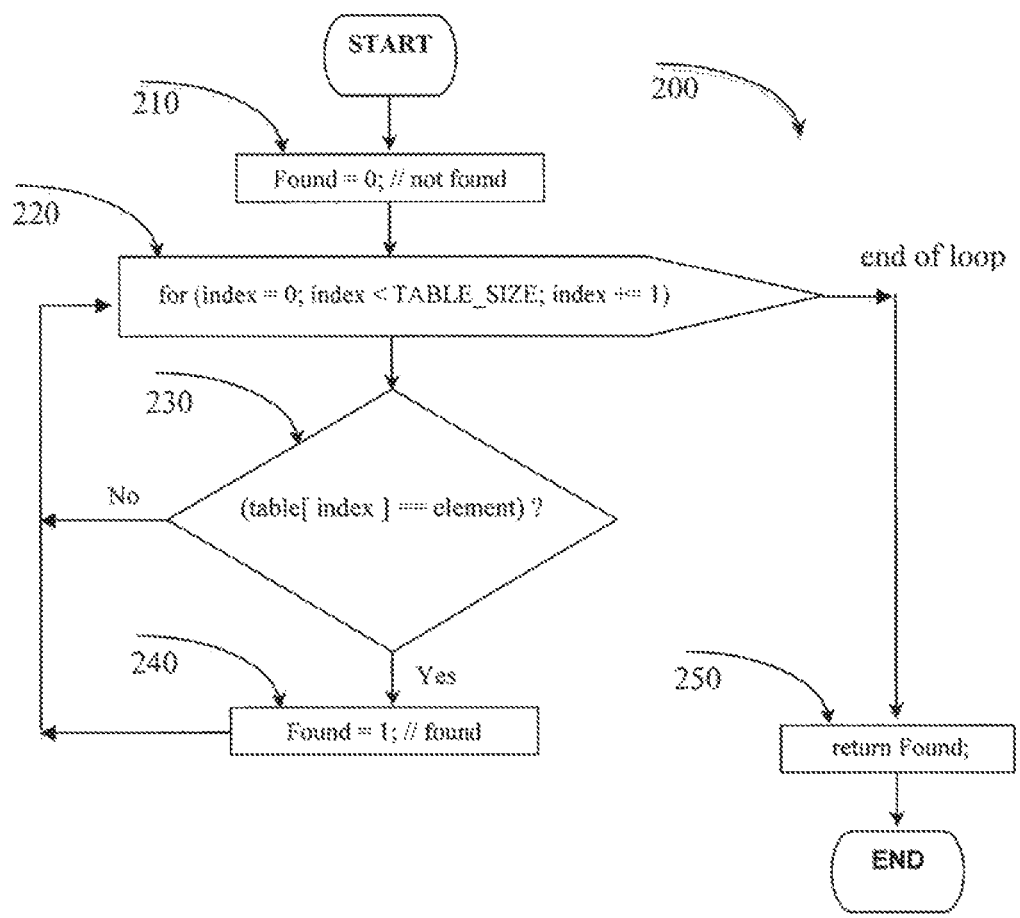
FIG. 2 is a flowchart depicting a testing of the given processing element, according to one embodiment of the invention.

FIG. 2 is a flowchart depicting an embodiment of testing if the given Processing Element is "In Use" 200, in which the initial condition is set to not "Found=0" 210. The (for) loop starts with the first index until the entire table is indexed 220 and then exits the loop to continue by returning the "Found" status 250. The table entry indexed is tested against the given element 230, and if "found" then "Found=1" is set 240, and the (for) loop continues.

Figure 3:
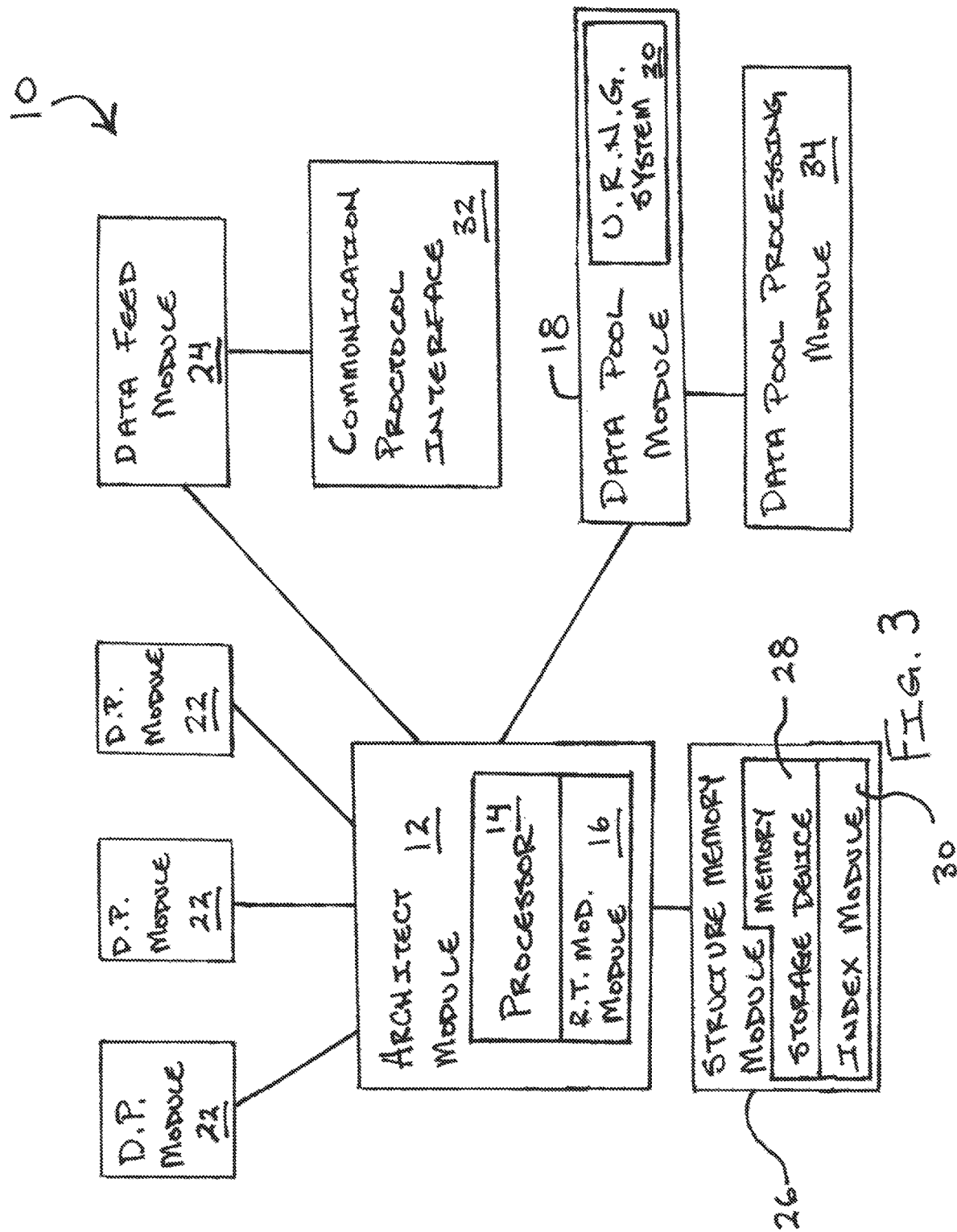
FIG. 3 illustrates a system of stochastic processing of information according to one embodiment of the invention.

FIG. 3 illustrates a system of stochastic processing of information according to one embodiment of the invention. There is shown an architect module coupled to each of a data pool module, a set of data processing modules, a data feed module, and a structure memory module. The illustrated data pool module is functionally coupled to each of a common data pool processing module and a communication protocol interface. The illustrated system is utilized to process an information stream (TCP/IP packets, telephone data, wireless communications data, private protocol communications, media files, data files, databases, and etc.) in a manner that transforms the information stream. This is generally done to prevent hacking of the information stream. Accordingly, the system may be used to enhance privacy, validate communications, verify authorship/source of communications, and the like and combinations thereof.

The illustrated architect module is configured to manage and control stochastic processing of data and may include a processor and/or may be associated with a processor, processor module, processing device/system or the like. It may also include one or more scripts for accomplishing the same and such scripts may be replaceable and/or associated with specific applications of the system. As a non-limiting example, there may be a script configured to provide optimal function for generation of digital signatures and/or certificates. An architect module may include a plurality of scaffolding points that may operate to receive other modules, especially data processing modules. Such scaffolding points may be predetermined and/or may be generated during run-time. Such points may interact with each other and may be sources of data for each other. Accordingly, the complexity of data processing may be predetermined and/or may be generated during run-time. An architecture module may include instructions on limitations of the scaffolding points including but not limited to maximum/minimum levels, points, connections, sources, redundancy of data processing elements, and the like and combinations thereof. The illustrated architect module may use random values to select between a plurality of functionally equivalent data processing modules during run-time. The architect module may use random values to select run-time durations for use of one or more of the plurality of functionally equivalent data processing modules during run-time. Such durations may be in actual time, clock cycles, data chunks processed, numbers of times or portions thereof of cycles made through repeating cycles of the data processing module, and the like and combinations thereof. Non-limiting examples of an architect module may be a control module as described in U.S. Pat. No. 5,430,836, issued to Wolf et al.; or a control module described in U.S. Pat. No. 6,243,635, issued to Swan et al. which are incorporated for their supporting teachings herein. An architect module may include but is not limited to a processor, a state machine, a script, a decision tree, and the like.

The illustrated architect module includes a run-time modification module configured to randomly alter a stochastic architecture during run-time. The run-time modification module may be seeded from the non-deterministic data pool module, thereby enhancing the randomness characteristics of the scaffolding over PRNG sources. The run-time module includes instructions for making alterations to the number of scaffolding points, the interconnections there between, the data processing modules used therewith, and/or the durations between such changes, and the like. Such a module may also track progress through a data processing task and as such may receive and act on information associated with the context of the data stream being processed (remaining amount/time of data to process, presence of repeating strings, number of communication cycles between respective parties, and the like and combinations thereof) and may alter operation of the run-time module during run-time in response to changes in such information. Non-limiting examples of a run-time modification module may be a modification system as described in U.S. Pat. No. 6,898,788, issued to Kosaka et al.; or a modification module as described in U.S. Patent Publication No. 2004/0205567 by Nielsen which are incorporated for their supporting teachings herein.

The illustrated non-deterministic data pool module is functionally coupled to the architect module so to be accessible by the same and/or by associated modules. It is configured to provide a stream of non-deterministic values that are, ideally not derived from a classical function (therefore non-deterministic). In one non-limiting example of such a pool, the non-deterministic data pool module includes one or more components of a URNG system. Such a pool may be sized to fit a particular desired use and/or may be used to create larger or smaller pools that may be used in the same or a similar manner. Non-limiting examples of a non-deterministic data pool may be a uncertain random number generator as described in U.S. Patent Publication No. 2010/00036900 and U.S. Patent Publication No. 2011/0029588 both by Ross which are incorporated for their supporting teachings herein.

The illustrated plurality of functionally equivalent data processing modules are functionally coupled to the architect module. In particular, each is configured to stochastically process data as called upon by the architect module. Generally, such data processing modules will include a defined operation used in association with a random value stream. As a non-limiting example, such a module may add, bitwise or in other "chunks," a random value from a random value stream to a value of an information/data stream thereby forming a transformed data value and may do so over and over when called upon. Accordingly, such a module generally requires access to a random value generation tool, such as but not limited to a PRNG, URNG, etc. Where maximum decryptable protection is required, a URNG is generally selected as a source as it will operate in a manner than is non-deterministic (one-way) and is reversible for those who have a copy of the pool used. Non-limiting examples of data processing modules may be a data processing system as described in U.S. Patent Publication No. 2010/0318851 by Learmonth: or a data processing module as described in U.S. Patent Publication No. 2009/0259862 by Bulusu et al., which are incorporated for their supporting teachings herein.

The illustrated data feed module is in functional communication with the architect module and is configured to feed a data set desired to be stochastically processed. Such a module may include instructions and/or hardware configured to manage, access, control and otherwise provide data to the system. Such a system may include interface tools for transforming data from its source to a form that is more usable by the system, such as through analog to digital or from one protocol to another. Such a system may transmit/receive data and/or may store the same. Non-limiting examples of a data feed module may be an in-feed module as described in U.S. Pat. No. 5,957,714, issued to Johnson et al.; or a feed module as described in U.S. Patent Publication No. 2010/0241417, by Bassett et al., which are incorporated for their supporting teachings herein.

The illustrated structure memory module is coupled to the architect module and is configured to provide sufficient information for an architect module to duplicate a predefined processing architecture and/or to record a utilized processing architecture such that it may be used later, by the same system and/or a similar/companion system. There may also be a memory storage device as part of or functionally coupled to the structure memory module. The illustrated structure memory module includes an index module that indexes structure according to a time structure. This is particularly advantageous because it permits time stamps of various sorts to be used as keys for seeding the URNG. Such time stamps are generally readily available, short, inexpensive to produce and/or transmit and permit associate systems using the same data pools to easily reverse data transformation. Such time stamps may be in the form(s) of actual time, clock cycles, data chunks processed, numbers of times or portions thereof of cycles made through repeating cycles of the data processing module, and the like and combinations thereof. Non-limiting examples of a memory storage device may include: a HP Storage Works P2000 G3 Modular Smart Array System, manufactured by Hewlett-Packard Company, 3000 Hanover Street, Palo Alto, Calif., 94304, USA; a Sony Pocket Bit USB Flash Drive, manufactured by Sony Corporation of America, 550 Madison Avenue, New York, N.Y., 10022. Data storage modules may be databases or data files, and the memory storage device may be hard drives or tapes. A non-limiting example of a data base is Filemaker Pro 11, manufactured by Filemaker Inc., 5261 Patrick Henry Dr., Santa Clara, Calif., 95054.

The illustrated common data pool processing module is functionally coupled to the non-deterministic data pool module and is configured to stochastically process a common non-deterministic data pool thereby generating an application specific non-deterministic data pool for use by the non-deterministic data pool module. In this way, a user may generate a personal non-deterministic data pool that may be used in many different settings and shared (in its transformed form) with a great variety of others without compromising the integrity of the common pool. In a way, the system may be used to generate an (virtually) unlimited number of non-deterministic data pools from a single common pool, without sharing the common pool and violating the integrity of the set. Non-limiting examples of a data pool processing module may be a system as described in U.S. Pat. No. 5,573,244, issued to Mindes; or a system as described in U.S. Pat. No. 5,517,556, issued to Pounds et al.

The illustrated communication protocol interface is in communication with the data feed module and is configured to feed a communication protocol map to the data feed module, receive a stochastically processed communication protocol map from the architect module, and/or to alter an information stream according to the stochastically processed communication protocol map. Such a communication protocol interface may operate to "break" a stream of information such that those devices/systems relying on data to meet certain minimum standards for a particularly defined data protocol will reject, fail to use, fail to "display" or otherwise determine that the information is unusable. As a non-limiting example, some protocols will reject packets of information that fail to meet a parity check. A communication protocol interface may operate the make certain that some or all packets in an information stream are transformed sufficiently to fail the parity check so that they are rejected by those who are not undoing the transformation. Such packets may appear to be simply bad packets by eavesdroppers. Non-limiting examples of a communication protocol interface may be a circuit as described in U.S. Patent Publication No. 2010/0277104, by Lin et al.; or an interface as described in U.S. Pat. No. 7,058,075, issued to Wong et al.; which are incorporated for their supported teachings herein.

According to one embodiment of the invention, there is a system of stochastic processing of information using a computing device 10. The system 10 includes an architect module 12 that includes a processor 14. The architect module 12 is configured to manage and control stochastic processing of data. The architect module 12 includes a run-time modification module 16 that is configured to randomly alter a stochastic architecture during run-time.

The system 10 includes a non-deterministic data pool module 18 is functionally coupled to the architect module 12 and is configured to provide a stream of non-deterministic values that are not derived from a function. The run-time modification module 16 is seeded from the non-deterministic data pool module 18. The non-deterministic data pool module 18 includes a URNG system 20. The system 10 includes a plurality of functionally equivalent data processing modules 22 that are functionally coupled to the architect module 12, and each may be configured to stochastically process data as called upon by the architect module 12. The architect module 12 is configured to use random values to select between the plurality of functionally equivalent data processing modules 22 during run-time. The architect module 12 is configured to use random values to select run-time durations for use of one of the plurality of functionally equivalent data processing modules 22 during run-time.

The system may 10 includes a data feed module 24 that is in functional communication with the architect module 12 and is configured to feed a data set desired to be stochastically processed. The system 10 includes a structure memory module 26 that includes a memory storage device 28. The structure memory module 26 is coupled to the architect module 12 and is configured to provide sufficient information for the architect module 12 to duplicate a predefined processing architecture and to record a utilized processing architecture. The structure memory module 26 includes an index module 30 that indexes structure according to a time structure.

The system 10 includes a common data pool processing module 34 that is functionally coupled to the non-deterministic data pool module 18 and configured to stochastically process a common non-deterministic data pool thereby generating an application specific non-deterministic data pool for use by the non-deterministic data pool module. The system 10 includes a communication protocol interface 32 that is in communication with the data feed module and is configured to feed a communication protocol map to the data feed module, receive a stochastically processed communication protocol map from the architect module, and to alter an information stream according to the stochastically processed communication protocol map.

Figure 4:
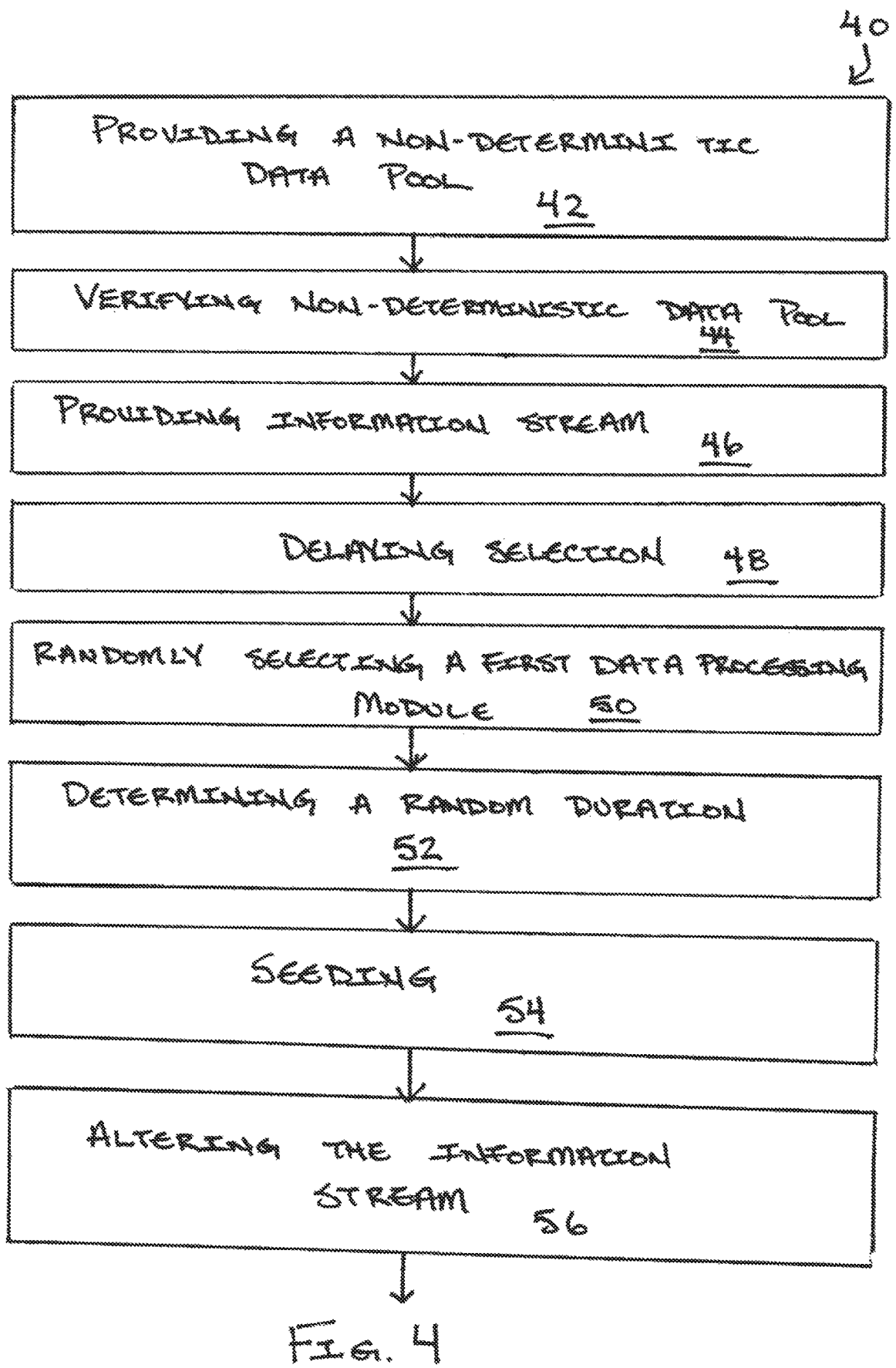

FIGS. 4-5 illustrate a method of stochastically processing information using a computing device. The illustrated steps permit a data/information stream to be processed in a manner that causes one-way transformation of the data while still permitting others who have sufficient information about the process to reverse the transformation and thereby have access to the data. Eavesdroppers and others who may gain access to the transformed data will not be able to use shortcuts to hack the data as the transformation is a one-way transformation. Further, because the process permits variation in the transformation operations, a single pool of non-deterministic values may be utilized almost infinitely without substantially devaluing the pool. In summary, a non-deterministic data pool is used to seed a scaffold of randomly selected data transformation processes that operate on an information stream while sufficient information about the process is recorded such that the information may be provided to another user of the method to undo the transformation, thus enabling extremely powerful and operationally inexpensive privacy, security, authentication, and other benefits. The illustrated steps are described individually below and it is understood that the illustrated order of steps is not necessarily the only order that may be utilized in operation of the method. Further, not all steps are necessary for various applications of the method.

The step of providing a non-deterministic data pool that is verified to be non-deterministic and is not derived from a function permits a bedrock of variability to be used in the method without subjecting the method to the weaknesses and vulnerabilities of deterministic PRNG functions but permitting reversibility not offered by environmental randomness sources. Such a pool may be formed as a URNG as described herein. Such a pool may be provided as a stored pool of data, a stream of data, or the like or variations thereof.

The step of providing an information stream to be processed permits the method to act upon an information stream. Such may be provided through communication tools/modules of any type that provides the information in a usable form to a system/device that may be operating the method. The information may be provided as a stream over a communications network (wireless, internet, intranet, bus, etc.) and/or may be provided through access to a memory device and/or memory feed such as but not limited to hard drives, flash memory, ROM, RAM, optical discs, and the like and combinations thereof.

The steps of randomly selecting a first data processing module, seeding a step of randomly selecting a data processing module from the non-deterministic data pool, altering the information stream by use of the first data processing module, randomly selecting a replacement data processing module replacing the first data processing module with the replacement data processing module, stochastically processing the non-deterministic data pool before utilization of the non-deterministic data pool, randomly layering use of a plurality of data processing modules such that the information stream is processed through multiple randomized layers of data processing modules, managing randomization such that each call to a source of random values goes to a different source than each previous call and altering the information stream by use of the replacement data processing module collectively and individually provide layers of structured variability within the method, thereby multiplying the usability of a single data pool and obscuring the data pool itself. Such a random selection may be seeded by the data pool and/or by another source. Such a random selection may be performed using another instance of this method. Such a random selection may be performed using a processor. The data processing modules selected from may be from a set of functionally equivalent data processing modules that may each be configured to alter data. Non-limiting examples of processes performed by data processing modules including: subtraction, masking, NAND, NOR, OR, XOR, AND, and addition and the like and combinations thereof.

The step of recording structure information sufficient to reproduce use of the first and replacement data processing modules permits such a one-way transformation to be reversed, thereby providing a useful benefit to receivers of the transformed data. Such recording may be as simple as a time stamp where corresponding systems are sufficiently configured and sufficiently identical to permit a time stamp to serve as a key for unlocking the data. Such recording may be more complicated and may include one or more scripts, data sets, and/or data processing modules that may be transmitted/packaged with and/or in association with transformed data.

The steps of delaying selection of all randomized data processing characteristics until run-time and/or determining a random duration of use of the first data processing module during run-time are very helpful in strengthening the resulting transformation against attack. Such a step may include having a predefined scaffolding structure but not selecting data processing modules to operate therein until runtime and/or not selecting seed values to be used in such systems until run-time.

The step of configuring an information stream according to a predefined communication protocol and the first and replacement data processing modules each sufficiently process the information stream to make the information stream fail to satisfy the requirements of the predefined communication protocol facilitates very inexpensive (processing cost) data protection because only time changes need to be made to the resulting stream in order to make eavesdroppers reject the data as corrupted, while recipients may only need to change a smaller percentage of the data in order to properly utilize the same.

The step of associating operation of the method with a time index such that operation of the method by counterparts beginning with identical time index positions and an identical non-deterministic data pool will process the information stream identically.

The step of verifying that the non-deterministic data pool passes the NIST test with a predominant 10/10 score provides a degree of security not otherwise found in other methods. Passing with a predominant 10/10 score means that more than 85%, 90%, 95%, 99%, and/or 99.9% of such testing results in a 10/10 score for non-overlapping template testing, serial testing, and linear complexity testing, while scores of 2/2 or 1/1 are achieved for all RandomExcursions testing. In particular, the NIST test referenced herein is the test for the Uniformity of P-Values and the Proportion of Passing Sequences found in the NIST Special Publication 800-22, A Statistical Test Suite for Random and Pseudorandom Number Generators for Cryptographic Applications which may be found at http://csrc.nist.gov/groups/ST/toolkit/mg/documents/SP800-22b.pdf which is incorporated by reference herein for its supporting teachings. In one non-limiting embodiment, only a common data pool is verified/tested thusly while subsequent pools created therefrom using the method(s) described herein are not tested. This is advantageous because such testing is computationally expensive and because it has been observed that pools that pass the NIST test and are then transformed by this method will continue to pass the NIST test without substantial degradation in the degree to which the test is passed. This is generally only possible with functions that are exponentially more expensive as further data is produced, while the presently described method is linearly expensive (time).

According to one embodiment of the invention, there is a method of stochastically processing information using a computing device 40. The method 40 includes the step of providing a non-deterministic data pool that is verified to be non-deterministic and is not derived from a function 42. The method 40 includes verifying that the non-deterministic data pool passes the NIST test with a predominant 10/10 score 44. The method 40 includes the step of providing an information stream to be processed 46. The method 40 includes the step of delaying selection of all randomized data processing characteristics until run-time 48. The method 40 includes randomly selecting a first data processing module, using a processor, from a set of functionally equivalent data processing modules, each configured to alter data 50.

The method 40 includes the step of determining a random duration of use of the first data processing module during run-time 52. The set of functionally equivalent data processing modules is selected from the group of data processing modules including: subtraction, masking, NAND, NOR, OR, XOR, AND, and addition. The method 40 includes seeding a step of randomly selecting a data processing module from the non-deterministic data pool 54.

The method of stochastically processing information using a computing device 40 includes the step of altering the information stream by use of the first data processing module 56. The method 40 includes randomly selecting a replacement data processing module, using a processor, from the set of functionally equivalent data processing modules while processing the information stream with the first data processing module 58. The method 40 also includes replacing the first data processing module with the replacement data processing module 60.

The method 40 includes the step of altering the information stream by use of the replacement data processing module 62. The information stream is configured according to a predefined communication protocol and the first and replacement data processing modules each may sufficiently process the information stream to make the information stream fail to satisfy the requirements of the predefined communication protocol. The method 40 includes randomly layering use of a plurality of data processing modules such that the information stream is processed through multiple randomized layers of data processing modules 64.

The method 40 further includes the step of recording structure information sufficient to reproduce use of the first and replacement data processing modules 66. The method 40 includes associating operation of the method with a time index such that operation of the method by counterparts beginning with identical time index positions and an identical non-deterministic data pool may process the information stream identically 68. The method 40 includes the step of stochastically processing the non-deterministic data pool before utilization of the non-deterministic data pool 70. The method 40 also includes the step of managing randomization such that each call to a source of random values goes to a different source than each previous call 72.

Figure 6:
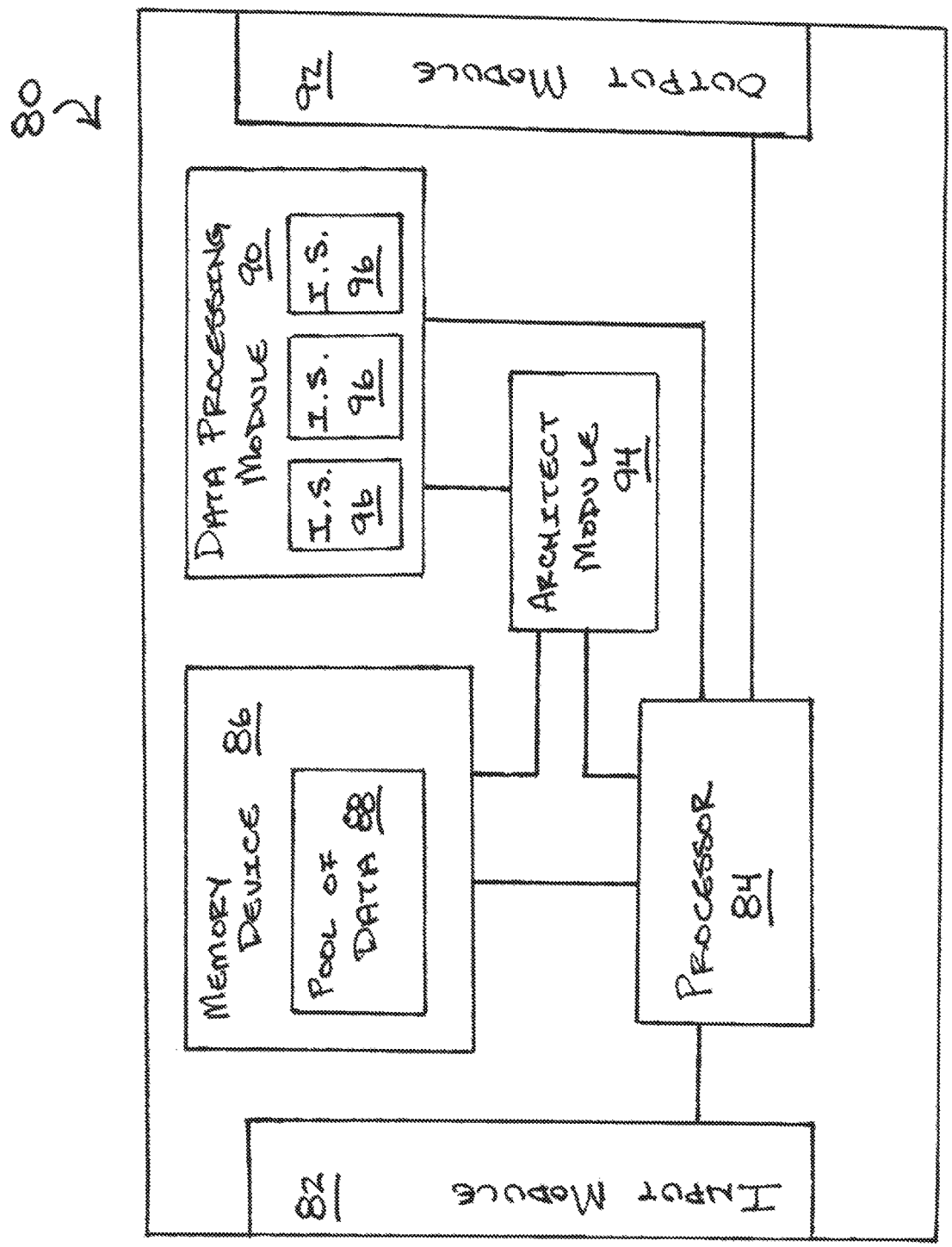
FIG. 6 illustrates a stochastic processing device configured to stochastically process information fed therein.

FIG. 6 illustrates a stochastic processing device configured to stochastically process information fed therein. The illustrated device includes a processor respectively coupled to a non-volatile memory device, a data input interface module, a data output interface module, and an architect module. In operation, the device permits a user to take a data/information stream to be processed and process it (transform it) in a manner that causes one-way transformation of the data while still permitting others who have sufficient information about the process to reverse the transformation and thereby have access to the data. Accordingly, a single device may be used to provide enhanced privacy, security, authentication, validation, verification and the like and combinations thereof for users of the same.

The illustrated processor may include one or more processing devices such as those found in common electronic devices (computers, servers, tablets, smartphones, etc.).

The illustrated non-volatile memory device may include one or more memory devices that does not lose data when unpowered. Hard drives and flash drives are non-limiting examples of such. The memory device is functionally coupled to the processor and includes a pool of non-deterministic data that is verified to have passed the NIST test with a predominant 10/10 score.

The illustrated data input interface module is functionally coupled to the processor and configured to receive data. The data output interface module is functionally coupled to the processor and configured to send data. Such interface modules may include data ports, USB ports, serial ports, network cards, wireless transmitters/receivers and the like and combinations thereof. Such will permit the device to communicate with other devices and/or systems.

The illustrated data processing module is functionally coupled to the processor and includes a plurality of functionally equivalent data processing instruction sets, or a library of such functions and/or data pools. Such may include one or more instances of a URNG pool/system.

The illustrated architect module is functionally coupled to the processor, the data processing module and/or to the non-volatile memory device and is configured to manage and/or control stochastic processing of data according to seed values from the pool of non-deterministic data. Such may be accomplished by randomly selecting data processing modules during run-time, thereby processing data received through the data input interface module and providing stochastically processed data to the data output interface module. Such an architect module may include one or more features, structures, functions and/or the like as described elsewhere herein.

According to one embodiment of the invention, there is a stochastic processing device 80 configured to stochastically process information fed therein. The device 80 includes a processor 84 and a non-volatile memory device 86 that is functionally coupled to the processor 84. The non-volatile memory device 86 includes a pool of non-deterministic data 88 that is verified to have passed the NIST test with a predominant 10/10 score. The device 80 includes a data input interface module 82 that is functionally coupled to the processor 84 and is configured to receive data. The device 80 includes a data output interface module 92 that is functionally coupled to the processor 84 and is configured to send data.

The device 80 also includes a data processing module 90 that is functionally coupled to the processor 84 and includes a plurality of functionally equivalent data processing instruction sets 96. The device 80 includes an architect module 94 that is functionally coupled to the processor 84, the data processing module 90 and to the non-volatile memory device 86. The architect module 94 is configured to manage and control stochastic processing of data according to seed values from the pool of non-deterministic data by randomly selecting data processing modules during run-time, thereby processing data received through the data input interface module and providing stochastically processed data to the data output interface module.

Uncertain Application Parameters

Since static parameters lead to deterministic results, many processing elements will require additional parameters to function correctly. Whenever possible, all of these parameters should be dynamically acquired from the uncertainty function or the URNG. In this way, each additional uncertain parameter continues to expand the scope of uncertainty.

Control Plane Responsibilities

The concept of the "control plane" was first covered in the original URNG patent. While the idea remains the same, the responsibilities have been generalized for stochastic processing. The selection/reselection of processing elements, initialization or re-initialization of processing elements, and updating of stochastic scaffolding points, are all executed with the primary goal of dynamically replacing many/most/all of these values/elements at some point during runtime execution.

An application designer is responsible for defining the policies that update processing elements or dynamic values. Simple tools like "countdown counters", or as complex as "application specific events" could be defined to trigger an update. These policies become important implementation details.

Stochastic Development

Within the methodologies of stochastic processing, random values inhabit many different functional roles, including selection of processing elements, programmatic control parameters, and simple data. Properly constructed stochastic processing scaffolding will also support the use of random values as software instructions. The simplest form of this type of scaffolding is the URNG's Chaos Engine. The Chaos Engine represents a single selection from a list of choices.

Within the limitations of our development tools and/or imagination, the open-ended application solution space remains a challenge to the programmer or hardware designer. The use of stochastic development concepts is just as open-ended; any dynamically defined quantities of processing elements, steps, passes, loops, and sequences can be created. In traditional programming, "control variables" direct the path through the code. Within stochastic development, many control variables are defined/or redefined at runtime with uncertain values. The unlimited range of chaotic actions remains to be defined by the complexity of this scaffolding. Once the scaffolding is set, only nondeterministic values are needed to exploit the chaotic actions. This newly created, unknowable runtime software completely transforms the application design space.

Stochastic "Scaffolding Points" Example

Look at the routine below and assume the following: design time static poolsize, addressing modulo, and a single (library) PRNG call. Clearly, the same routine would be more deterministic. So, we add methodologies of Stochastic Processing, with a substantial collection of PRNG functions from which to choose. Each of the following PRNG calls is dynamically selected with a different function and seeded via uncertain data. In addition, the "poolsize" and "modulo" uncertain parameters are defined when the source file is created. In this way, some of the known flaws of a single PRNG are mitigated while the overall scope of uncertainty is widened. The net effect is a nondeterministic, uncertain random number generator known as the Mask URNG.

```
typedef struct
{
uint32_t        poolsize;   // allocation size in r_values
uint32_t        modulo;     // prime number addressing modulo
t_prng prng[ NUM_STOCHASTIC_POINTS ]; // PRNG addressing functions
r_value   *     pool;       // data pool pointer
} t_urng;
r_value urng_value (t_urng *urng)
{
r_value unsafe_1, unsafe_2;    // paradox unsafe PRNG deterministic values
r_value domain_1, domain_2;    // paradox safe domain values
r_value mask1, mask2, mask3;   // Raw nondeterministic values from the pool
// Use 3 independent PRNGs to read uncertain mask values from the pool
mask1 = urng->pool[ prng (1) % urng->modulo ];
mask2 = urng->pool[ prng (2) % urng->modulo ];
mask3 = urng->pool[ prng (3) % urng->modulo ];
// Convert deterministic PRNG values into a paradox safe domain values
unsafe_1 = prng (4);
unsafe_2 = prng (5);
domain_1 = (~mask1 & unsafe_1) | (mask1 & unsafe_2 ) % urng->modulo;
unsafe_1 = prng (6);
unsafe_2 = prng (7);
domain_2 = (~mask2 & unsafe_1) | (mask2 & unsafe_2 ) % urng->modulo;
// Manufacture a nondeterministic value from the pool while hiding domain and range
    return (~mask3 & urng->pool[ domain_1 ]) | (mask3 & urng->pool[ domain_2 ]);
};
```

However, by adding the dynamic unknowable replacement of these PRNGs with new seed values, and creation of on-demand pools of uncertainty, the same implementation then becomes a dynamic custom solution each time it is invoked.

Stochastic Scaffolding—Chaos Example

We now start with two collections, one for PRNG functions and another one for URNG Random Edit Processes (REP) functions. Using the same data driven processes for selecting PRNGs, we also select and create a REP list. Each random edit process is a decoupling process. While the Mask Generator represents only one decoupling process, the Chaos URNG (see above code) uses uncertain values to choose among many decoupling processes. The overall result is substantially more uncertain random values created from the same pool of uncertainty.

Effects of Stochastic Processing

The uncertainty of stochastic processing demonstrates why this is a much more useful application of randomness. Without the exact pool data, no one can predict, (from knowledge of the implementation), which version of a custom solution will be invoked. Current (static) implementations in hardware and software conform to mathematical certainty. These static solutions will give way to dynamic solutions. These technologies of uncertainty will free applications to become chaotic, less expensive and much better solutions.

Dynamic Digital Protocols

Data structures and actions define current digital protocols. Developers apply painstaking efforts to perfect implementations of these protocols. This near perfection of implementation means that most current digital protocols are extremely fragile. How do we protect fragile data structures within digital protocols? Only by deliberately breaking them do we gain the means to protect them . . . this irony defines the Data Structure Protection Paradox.

To utilize this paradox, with the aid of stochastic processing, we use data structure fragility as a tool—we create a dynamic means to uniquely "break" the perfection, and then uniquely "restore" the perfection of the same data structure. We can see the value of this fragility with a simple contrast. While a canon can kill a housefly, so can a fly swatter. Both complete the task, yet one of them remains completely inappropriate for the scale of the problem. Encryption can protect a digital protocol, yet it remains as inappropriate as a canon is to kill a housefly as each appears to represent massive overkill.

Given this understanding about sensitivity to disruption, we should look closer at the internal data structures of these protocols. Today, all digital protocols are defined to be static with respect to data structures. Instead of encryption to gain protection from hacking, we should apply "dynamic evolution" to transform these static protocol data structures into unknowable "moving targets". The ongoing, lightweight random evolution allows people to still read (with effort) the data structures, but prevents programmers from predicting the next evolutionary change. Thus, we gain the hacking protection of encryption for barely any cost.

To demonstrate how this works, we start with a common example of a digital protocol—computer instructions. Changing just a few bits can easily break the underlying software defined by these instructions. In nearly every case, the change of just one bit per instruction results in the destruction of the software program. Therefore, the breaking and the restoration of software can be an inexpensive lightweight process.

Any given CPU processor defines public data structures for its instruction. A custom, inexpensive, and dynamic means to break and then restore software instructions can transform these public protocols into private protocols. This transformation would make a useful tool to implement a Digital Rights Management (DRM) system for software, books, media, etc.

Basic economics drives the demand for custom solutions. When people share a common DRM system, they also share the same risks of hacking. The cracking of the first DVD copy protection exposed the risks of using common protection. Once the first DVD copy protection was cracked, then all protected DVDs were at risk. Thus, the sharing of common protection effectively invites large economic payoffs to defeat them. In contrast, if all media were guarded by custom protection, then the successful cracking of one piece of protected media would not risk any other protected media. This poor return on effort would foil most cracking for profit.

Since shared data protection invites larger economic payoffs, it also generally requires stronger protection (Blu-ray for example). However, custom protection justifies simpler implementations. The deployment of dynamic digital protocols resets these basic rules of economics. After illustrating why the fragility of protocols is helpful, as well as the economics, we now discuss the details of implementation.

Common Custom Environment

There are two parties in most digital protocols—the producer (source or initiator) and the consumer who processes the protocol. To be successful with dynamic digital protocols, these two parties generally must start with the same custom environment, which include a common source file, timestamp, URNG implementation, and stochastic processing application(s). In this way, both parties know that they have the same random data stream(s) and application(s) to process them into compatible dynamic digital protocols. So long as the dynamic digital protocol "producer" and "consumer" are synchronized, they can continue to exchange data structures without concern that they may be hacked. Without exactly the same environment, no one else can create the expected data structure that will be accepted by the protocol consumer.

Innovations Around the Data, Address, and Control Planes of Randomness

Each of these "planes" represents an independent opportunity for innovation. One can change the addressing into the data pool without affecting the data. Likewise, fixing (freezing the state) on one plane still allows developers to innovate in the other planes. These opportunities for innovation flow from the properties of the Uncertainty Function. Therefore, these same opportunities are available within stochastic processing (data/address/control planes).

Stochastic processing generally requires the ability to reproducibly create the same random streams. This requirement can be met via an open-ended number of solutions, from pre-generating data, resetting implementations, or building URNG primitives to support this requirement. These primitives lay the groundwork for building dynamic digital protocols.

Any given source file contains a pool of uncertainty, and a time model. The timestamp determines the seed values within the pool of uncertainty, defining which instance of a URNG will be created. Therefore, any timestamp represents an addressing function into all possible URNG instances. While each URNG instance is limited to producing one random stream, many different streams can be produced from the same pool of uncertainty. The following are supporting primitives:

Static URNG Primitive

The "Static UNRG" creates an URNG instance based on the pool of uncertainty found in the source file. Each unique timestamp creates a different instance of the URNG while sharing the same data.
    t_urng*static_urng (char*source_name, t_timestamp timestamp);

Dynamic URNG Primitive

The "Dynamic URNG" takes the given source file and timestamp to create a new pool of uncertainty. This new pool of uncertainty and timestamp defines this dynamic instance of the URNG. Therefore, each unique timestamp creates a unique random number generator, which in turn creates a unique random stream.
    t_urng*dynamic_umg (char*source_name, t_timestamp timestamp);

The same source file, timestamp, and above primitives create the same instance of the URNG, and subsequently produces the same random stream. Once a given URNG instance is defined, then the data plane has been assigned.

Clone URNG Primitive

The "Clone URNG" creates a copy of the given URNG instance. Each clone will produce the same random stream from the point of cloning.
    t_urng*clone_umg (t_urng*urng);

URNG Value Primitive

The "URNG_value" is the standard URNG interface primitive for obtaining random values.
    r_value urng_value (t_urng*umg);

Random Sub-Streams—Indexed URNG Primitive

The "indexed URNG" is the interface primitive for obtaining the next random value in the "indexed" stream. Each time that the index changes, the index stream resets. This "resetting" allows the indexed URNG to be reused and thus reproduce any indexed stream. An example would entail setting the index to a temp value, and then restoring back to the previous index, so that the same index stream would start reproducing the same random stream. The use of the clone URNG interface primitive, in conjunction with the indexed URNG interface primitive, allows any number of (different) simultaneous random streams to be supported from the same pool of uncertainty.
    r_value indexed_umg (t_urng*urng, int32_t index);

The Virtual Cut—Memory Address+Offset

For example, adding an offset of the memory address used to read the data pool(s) has the same effect as moving the origin of the memory range. This is similar to "cutting" the deck in a card game.

The Virtual Shuffle—Memory Address XOR Shuffle Value

The act of a bit-wise XOR of a Shuffle Value with a memory address is comparable to the effect of a quick shuffle in place—the memory range has been reordered by the XOR operation. One can shuffle then cut, or one can cut then shuffle. These virtual card tricks can be performed as many times as one wishes.

Random Sub-Streams—Using the Memory Address Offset

Manipulating the memory address can have some very useful side effects. Normally, the uncertainty random value generator would only produce one random stream. If each memory address used within the uncertainty random value generator had an offset added to it, then a different random sub-stream would be produced for each different offset. Any number of arbitrary random sub-streams can be produced via selective addition of memory-offset values. This gives us a randomly addressable sub-stream whenever it is needed. This tool is very useful in many applications.

The Identification of Source Files and URNG Instance

In most cases, the naming of a "file" generally requires first identifying where it can be found (path name) within some form of "name space". Typically, only the last part of the location is used to name the file. While the path name specifies the external source file identification, additional internal identification exists: a creation timestamp and a non-unique identifier. Between the external and internal identification, any source file should be located within known systems. Once the correct source file has been found, a dynamic identifier (open file ID) can be defined.

As source files and timestamps are employed to create URNG instances, they are given dynamic URNG instance identifiers. As clone instances are created, they are also given additional identifiers. Clearly, stochastic processing applications will have to manage and track these URNG instance identifiers.

In hardware applications, the loading of the pool of uncertainty, and initialization of address generators completes the identification of a URNG instance. Each additional addressing generator that supports "cut" (with or without "shuffle") provides the means for indexed URNGs.

The Synchronization of Producers and Consumers

So long as the producer and consumer of data structures start with the same source file and timestamp, they have reached the first level of synchronization by creating the same instances of the URNG. The stochastic processing application(s) generally must define values (sub-stream identifiers) that represent distinct random sequences. These sub-stream identifiers become the "index" values of the indexed URNG primitive. Each time the stochastic processing application generally requires a new random sub-stream, it can just create a new index (stream) value. This index value may or may not be in the data structure. For example, some Internet protocols have "sequence numbers" embedded in the protocol definition; these sequence numbers can be mapped into index values. These index values become a fine grain addressing (time) function for randomness. Clearly, while most protocol sequence numbers are ordered for a reason, these index values do not need to be contiguous. So long as the algorithm for creating and managing these indexes is correct, the indexed URNG primitive will give the same random sub-stream for any given (valid) index.

Starting index values can be explicitly or implicitly defined by the application. A transaction accounting number could be an example of an explicitly defined index, while the third attachment in an email could be an implicit example. However, any application specific algorithm can create any (valid) index values.

Application-Specific Collections—Hash Functions, Breaking and Restoring Processes The task of protecting the fragile (static) data structures within digital protocols may require up to two different application-specific collections of processing elements. The first collection is some form of "hash" or Cyclic Redundancy Check (CRC) function that reduces a data structure into a single value. If needed, the second collection is used to invoke the data structure protection paradox.

The possibilities of "breaking and restoring" static data structures are infinite, so it will remain an open-ended solution space. Any reversible means to mangle the static data structure . . . and then restore it is equally effective. This list of examples to process static data structures represents just a hint of possible solutions. Once the static data structure is created, then any combination of the following can be employed: bit flipping of any size, bit swapping of any size, data of any size injected and then removed, rotating any number of bits left or right (within any size unit), reversing bit order of (byte, 16-bit, word), etc. As an open-ended solution space, many more solutions can be created.

The reversible morphing of a static data structure can be inserted between many existing hardware and/or software solutions. This protection upgrade can be accomplished for relatively low cost to or disruption of existing systems.

Another means to protect fragile data structures is to directly move towards dynamic data structures. For example, many different data structures can be overlapped (formatted) via a "variant record" means. In this way, the same overall data can be stored in roughly the same amount of space. Within each variant record, the only significant difference is that the same fields are stored in a different order. Both producer and consumer would have to synchronize whichever variant is to be used this time. The ideal synchronization would be selection of a variant record (or selection of a routine to construct a variant record) based on uncertain data. In this way, over time, the same fields within the data structure would appear to be constantly moving. This variant record solution does not require the "breaking and restoring" collection, but does require reworking the hardware/software accesses to the fields within the data structures.

The incorporation of breaking the certainty of existing static data structures should be so low cost that it can become almost ubiquitous. In this way, we gain security of digital protocols without any substantial overhead. The second collection (hash function or CRC) gives an option that may carry even lower overhead.

Upgrading the CRC Metaphor to Become the Ross Integrity Check (RIC)

Many Internet protocols employ a CRC function to detect damaged (invalid) packets. If the CRC check fails, then the packet is discarded. These protocols naturally replace the missing packet and the only result is a temporary glitch. There are many different CRC functions currently deployed throughout the network. However, in order to function as intended, each invocation of a current CRC generally must use the correct function. This defines the current CRC metaphor.

So, we can change the metaphor with a simple question—what happens if the wrong CRC function was invoked? In this case, the protocol is broken and each request is discarded. If this consistent failure of a CRC check is the correct intent, then the CRC value has become a failed "digital signature". Unfortunately, if the CRC function becomes known, then the CRC value could be hacked to an extent that it passes the CRC check. To complete the solution and prevent hacking, we generally must incorporate uncertain data into the CRC computation. This required uncertain data (of uncertain size) could only be produced by the correct instance of an URNG. Thus, the collection of hash/CRC functions plus additional uncertain data actually upgrades the simple CRC metaphor to become a secure digital signature for each packet. Therefore, any unauthorized packets are ignored. This RIC replacement of the CRC metaphor remains low cost enough to become ubiquitous.

Given an uncertain selection of a hash/CRC function from the collection and an uncertain data addendum of uncertain size, we compute the data structure plus addendum hash/CRC RIC value. The service provider selects the same hash/CRC function, creates the same uncertain addendum, and then computes the RIC value. The service is only provided if the authentication matches the value found in the data structure.

Applications of the RIC

Clearly, the RIC could be added to any digital protocol to provide a low cost means for authentication. Many services are provided without authentication, while others have very complex infrastructures to support authentication (Secure Socket Level SSL for instance). If the one time data exchange has been completed, then we have also exchanged random number generators. Therefore, we have also set up the minimal required infrastructure to support authentication. Assuming shared stochastic processing application(s) are used via this data exchange, then dynamic custom applications in either hardware or software have also been exchanged.

Converting Public Addresses into Private Addresses (Fine Grain Access Control)

Let us assume that many service providers have known "public addresses". Assuming these service providers are upgraded to support RIC authentication, then only authorized services will be provided, while all other requests are ignored. Thus, the RIC becomes a form of revocable access control for the service. This access control has an open-ended number of possible applications.

Here is a simple example of this effect: if my phone optionally supports RIC authentication, then I could "open" my phone number during the day, while limiting (closing) access at night to only those that I gave permission to call me. Another way to view the effect of the RIC is to think of this as converting the public (known) address into a private (authorized only) address. Now, any email, phone number, control system, IP address, financial or Internet transaction, etc. can have fine-grain access control.

The lack of fine-grain revocable access control plagues many applications. For example, the typical access given to databases covers all records. Instead, many organizations would benefit from dynamically limiting access to only those records where a need-to-know has been authorized, while denying access to the rest of the database. Clearly, this fine-grain access control would be useful in healthcare and IRS organizations. This type of access control is another wide-open application space.

Stochastic Scaffolding—the Same Distinct Breaking/Restoration Algorithm

The Breaking and Restoring (BR) process continues with the stochastic scaffolding framework. Each developer of BR applications will be creating a framework for the multi-step selection and invocation of BR processing elements. The limitations set upon programmatic control variables (number of steps, order of steps, selection of BR elements, etc.) are all defined by the data produced by the URNG.

While the synchronization is established with the correct URNG instance, each part of the stochastic scaffolding starts with the same distinct uncertain data. Each sub-step within the framework may require additional data parameters. Any parameter, data item, selection value, chaos instruction, etc. can be provided with the indexed URNG in a consistent (and reproducible) manner.

Clearly, the framework will have to deal with restoring whatever breaking was accomplished. Assuming that any new breaking process element may affect the results of previous breaking process elements, then the restoration sequence will have to back out each break by restoring them in reverse order. The processing of a "last in first out (LIFO)" stack is a classic, well-understood, algorithmic metaphor.

Assuming that both the BR process and RIC are employed, then the RIC value is computed and saved within the data structure before any changes are made. Once the data structure is restored, then the RIC is recomputed to validate the data structure and confirm authorization.

Optional Use of Breaking/Restoration or RIC

The above section covers the case where both the BR process and RIC are employed at the same time. However, there are many valid applications in which only one of them would be used. The RIC will stand alone in many digital protocols as a low cost solution for access control. The standalone use of the BR process will be used in cases of software DRMs. If only the RIC is employed in this software DRM case, then that single point of attack would be a tempting target to hack, thus overriding the effect of the RIC. However, the standalone use of the BR process is strong enough to protect the software. After all, any improperly restored software remains nonfunctional. There are an open-ended number of applications that will only use either the BR process or the RIC.

Data Congruential Generator

Figure 7:
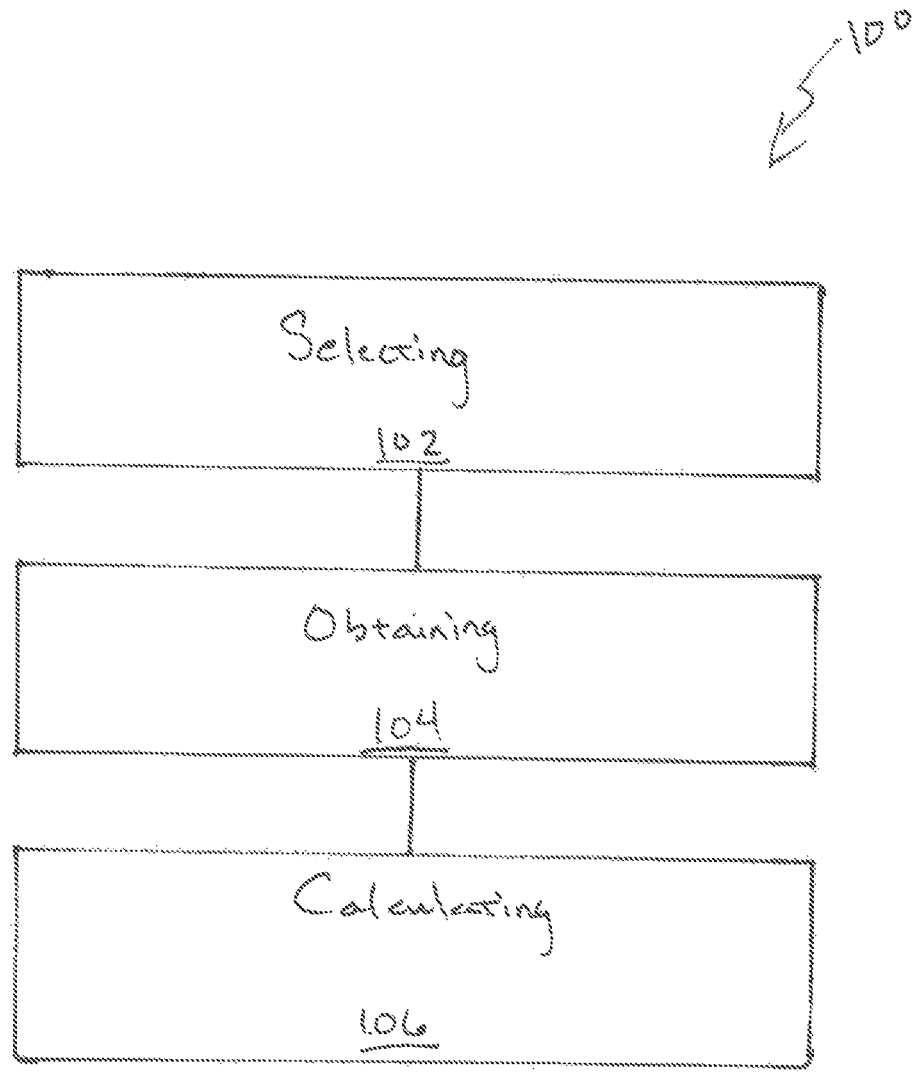

"Linear Congruential Generators" produce deterministic values that generally must be transformed into paradox safe values within the URNG implementation. While the requirements for producing paradox safe domain values for the Uncertainty Function remain the same, the removal of the flawed PRNG simplifies the process with better randomness quality:
    mask=urng->pool[prng (1) % urng->modulo];
    unsafe_1=ping (4);
    unsafe_2=ping (5);
    domain=(~mask & unsafe_1)|(mask & unsafe_2) % urng->modulo;

Starting with one (or more) nondeterministic value(s) from the pool of uncertainty, we can generate a domain value from a prime modulo operation. Instead of a "Linear Congruential Generator", we replace a "linear" equation with paradox safe data to produce the Data Congruential Generator (DCG). Given two random indexes (seed0, seed1) into the pool of uncertainty, here is the replacement C code example.
    uint64_t y:
    uint32_t hi, low, domain;
    hi=urng->pool[seed0++% urng->modulo];
    low=umng->pool[seed1--% urng->modulo];
    y=((uint64_t) hi<<32)|(low);
    domain=(y % prime) % urng->modulo;

See FIG. 7, wherein the above code is expressed as a method 100, wherein the provided pool of uncertainty (generated as described herein, and thereby not being derived from a function, i.e. a URNG, not a PRNG) has a data pool size (see below in the "C header section") and including the illustrated step of selecting 102 a number, thereby generating a divisor (the illustrated divisor is a prime number identified as "prime" in the illustrated code), followed by the illustrated step of obtaining 104 a first value from the pool, (the first value, as shown by the code, is generated by indexing, via an index (e.g. seed0 and seed1), into the data pool to generate hi and low values and then concatenating, via a concatenator, which is a binary operator (see the "|" symbol in the illustrated code), the hi and low values (each 32 bit numbers) from the pool into a single 64 bit number by performing a binary operation (the logical OR in the code is a binary operation that concatenates the operands in combination with the shift operation ("<<") which causes the "hi" value to be in the upper 32 bits of the 64 bit "y" when the hi and low values are concatenated together via the OR operand to form a single 64 bit integer) on the two separate values), followed by the illustrated step of calculating 106 the modulo of the first value by dividing the first value by the divisor and determining the remainder thereof, thereby creating a modulo value Which is a first remainder value. The first value may also be obtained by performing a random edit process on a first set of two separate values (e.g. hi and low) (e.g. see the "C header" section below) and the code, if executed again, may be repeated on a second set (that may be generated via incrementing up on one and down. on the other e.g. the ++ and – operands) to produce a different "y" value from which a different remainder value may be. The code also shows calculating a first remainder by performing a modulo operation with the concatenated "y" value as the numerator and a prime number (stored as "prime" in the illustrated code) as the denominator (i.e. the illustrated code portion "(y ° prime)"). The code further shows calculating a subsequent or second remainder by performing a modulo operation with the first remainder as the numerator and a second denominator (the "urng->modulo" in the illustrated code (i.e. the code segment "% urng->modulo" of the code segment starting with "domain=") thereby producing a second remainder, Note: this embodiment uses the concatenation of two 32-hit values to create a 64-bit value. In lieu of concatenation, nearly any binary operation will function as well. While a single pool value is functional, it tends to repeat the same addressing sequence far too quickly. By replacing the above "prime" number, one can create a different domain value generator. The DCG embodiment can be created in either hardware of software.

C Header

This C header fills in some details missing in the above code snippets

```
#define MAX_REPS                 16
#define INSTRUCTIONS_PER_WORD    8
#define INSTRUCTION_MASK         0xF
#define INSTRUCTION_SHIFT        4
#defineNUM_STOCHASTIC_POINTS     7
#define prng( num ) ((*urng->prng[ num ].PRNG)( &urng->pmg[ num ].state ))
typedef   uint32_t   r_value;         // base type of uncertainty value
// generic PRNG function
typedef r_value (*PRNG_function)(r_value* seed);
// generic Random Edit Process
typedef r_value (*edit_process)(r_value, r_value, r_value);
typedef struct
{
   PRNG_function   PRNG;
   r_value         state;
} t_prng;
// STRUCTURE : t_chaos
//
// Chaos CPU
//     instruction (block) currently 4 bits each
//     PC Program Counter within instruction block
//     16 CPU operations indexed via 4 bit instruction
//     each operation is a generic Random Edit Process
//     each operation is randomly selected via uncertainty value from REP table
//
// Since each instruction block is randomly fished from pool of uncertainty and then
// used to perform random operations against other random streams, the Chaos Engine
// is an appropriate name.
typedef struck
{
r_value        instruction;   // random value holding instructions
r_value        PC;            // current instruction counter within above instruction
edit_process   operation[ MAX_REPS ]; // table of chaos operations (Random Edit
Processes)
} t_chaos;
typedef struct
{
uint32_t    poolsize;   // allocation size in r_values
uint32_t    modulo;     // prime number addressing modulo
t_prng      prng[ NUM STOCHASTIC_POINTS ]; // PRNG addressing functions
t_chaos     cpuAdr0;    // address chaos engine
t_chaos     cpuAdr1;    // address chaos engine
t_chaos     cpudata;    // data chaos engine
r_value     *pool;      // data pool pointer
} t_curng;
typedef struck
{
uint32_t    poolsize;   // allocation size in r_values
uint32_t    modulo;     // prime number addressing modulo
t_prng      prng[ NUM STOCHASTIC_POINTS ]; // PRNG addressing functions
r_value     *pool;      // data pool pointer
} t_urng;
```

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the above discussion describes particular uses for such systems, methods and etc., it is understood that the applications are plethoric and in some cases unknowable at this point.

Additionally, although the figures illustrate specific connections, relationships, and sequences, it is understood that the plethoric connections, relationships and sequences not described by but also not contraindicated by the claims are envisioned and may be implemented in one or more non-limiting embodiments of the invention.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A system for addressing memory locations within a first data pool in a first memory device of a computing system, comprising:
   a) a second memory device having a non-deterministic data pool having a data pool size;
   b) a stored prime value;
   c) an operator that derives a first value based on values in the non-deterministic data pool;
   d) a hardware or software modulo operator in functional communication with the second memory device and the stored prime value that divides the first value by the stored prime value thereby determining a first remainder; and
   e) a memory controller in functional communication with the hardware or software modulo operator that addresses the first data pool using a domain derived from the first remainder for a memory access operation, wherein the first data pool and the non-deterministic data pool may be a same or different data pools and wherein when they are the same data pools then the first memory device and the second memory device are also the same devices.

2. The system of claim 1, further comprising a replacement prime number that is used to create a different domain value generator.

3. The system of claim 1, further comprising a hardware or software incrementor that increments or decrements an index to the non-deterministic data pool from which the first value is derived.

4. The system of claim 1, wherein the operator is further comprising a concatenator, wherein the first value is obtained by concatenating, via the concatenator, two separate values from the non-deterministic data pool.

5. The system of claim 1, wherein the operator is further comprising a binary operator, wherein the first value is obtained by performing a binary operation, via the binary operator, on two separate values from the non-deterministic data pool.

6. The system of claim 1, further comprising an index, wherein the first value is obtained by randomly indexing, via the index, into the non-deterministic data pool.

7. The system of claim 1, wherein the non-deterministic data pool is not a direct result of a function.

8. The system of claim 1, wherein the hardware or software modulo operator further calculates a second remainder by dividing the first remainder by a second denominator and thereby determining a second remainder thereby deriving the domain used by the memory controller.

9. A method of accessing a memory address of a data pool of a computing device, comprising:
   a) providing a non-deterministic data pool stored within a memory device, wherein the non-deterministic data pool has a data pool size;
   b) providing a prime number;
   c) obtaining a first value based on values from the non-deterministic data pool;
   d) calculating a first remainder value, by operation of a hardware or software modulo operator and using a processor if the software modulo operator, of the first value by dividing the first value by the prime number and determining a remainder thereof, thereby creating the first remainder value; and
   e) accessing a memory address, using a memory controller, within the data pool that may be the same or different from the non-deterministic data pool, by using a domain value derived from the first remainder value to determine an addressing value.

10. The method of claim 9, wherein the prime number is replaced by a second prime number.

11. The method of claim 9, further comprising incrementing or decrementing an index to the non-deterministic data pool from which the first value is derived.

12. The method of claim 9, wherein the first value is obtained by concatenating two separate values from the non-deterministic data pool.

13. The method of claim 9, wherein the first value is obtained by performing a binary operation on two separate values from the non-deterministic data pool.

14. The method of claim 13, wherein the two separate values are obtained by randomly indexing into the non-deterministic data pool.

15. The method of claim 9, wherein the first value is obtained by randomly indexing into the non-deterministic data pool.

16. The method of claim 9, wherein the method further comprises deriving the domain value from the first remainder value by calculating a second remainder value by dividing the first remainder value by a second denominator and determining a remainder thereof, thereby generating a second remainder value and using the second remainder value as the domain value used for the memory controller.

17. The method of claim 9, wherein the non-deterministic data pool is not derived from a function.

* * * * *